US012082056B2

(12) United States Patent
Yiu et al.

(10) Patent No.: US 12,082,056 B2
(45) Date of Patent: Sep. 3, 2024

(54) GENERATION NODE-B (GNB), USER EQUIPMENT (UE) AND METHODS FOR HANDOVER BASED ON MULTI-CONNECTIVITY IN NEW RADIO (NR) SYSTEMS

(71) Applicant: Apple Inc., Cupertino, CA (US)

(72) Inventors: Candy Yiu, Portland, OR (US); Jing Zhu, Portland, OR (US); Richard C. Burbidge, Shrivenham (GB); Kyeongin Jeong, Youngin-si (KR); Sudeep K. Palat, Cheltenham (GB)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 16/479,176

(22) PCT Filed: Feb. 1, 2018

(86) PCT No.: PCT/US2018/016491
§ 371 (c)(1),
(2) Date: Jul. 18, 2019

(87) PCT Pub. No.: WO2018/144758
PCT Pub. Date: Aug. 9, 2018

(65) Prior Publication Data
US 2019/0373519 A1 Dec. 5, 2019

Related U.S. Application Data

(60) Provisional application No. 62/455,491, filed on Feb. 6, 2017, provisional application No. 62/453,969, filed on Feb. 2, 2017.

(51) Int. Cl.
H04W 36/00 (2009.01)
H04W 36/08 (2009.01)
H04W 36/30 (2009.01)

(52) U.S. Cl.
CPC ....... H04W 36/0069 (2018.08); H04W 36/08 (2013.01); H04W 36/30 (2013.01)

(58) Field of Classification Search
CPC . H04W 36/0069; H04W 36/08; H04W 36/30; H04W 88/08; H04W 36/18; H04W 36/00; H04W 36/02
(Continued)

(56) References Cited

U.S. PATENT DOCUMENTS 10,064,051 B2* 8/2018 Ingale ................... H04L 5/0048
2016/0212661 A1* 7/2016 Basu Mallick ... H04W 36/0027
(Continued)

OTHER PUBLICATIONS

"Inter-RAT mobility for NR", R2-168505, 3GPP TSG RAN WG2 Meeting #96, Reno, USA, (Nov. 5, 2016).
(Continued)

Primary Examiner — Nizam U Ahmed
(74) Attorney, Agent, or Firm — Kowert, Hood, Munyon, Rankin & Goetzel, P.C.

(57) ABSTRACT

Embodiments of a generation Node-B (gNB), User Equipment (UE) and methods for communication are generally described herein. A source gNB may operate as a master gNB (MgNB) before a handover. A target gNB may operate as a secondary gNB (SgNB) before the handover. The target gNB may operate as the MgNB after the handover. The target gNB may, as part of operation as the SgNB, transmit a first data packet received from the source gNB for relay to the UE. The target gNB may, as part of operation as the MgNB, transmit, a second data packet received from a serving gateway (SGW) for relay to the UE.

22 Claims, 14 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2016/0338134 A1* | 11/2016 | Nagasaka | ............. | H04W 76/15 |
| 2017/0195935 A1* | 7/2017 | Xu | ........................ | H04W 36/18 |
| 2018/0084464 A1* | 3/2018 | Ozturk | ................... | H04W 76/25 |
| 2019/0349822 A1* | 11/2019 | Kim | .................. | H04W 36/0069 |
| 2020/0267753 A1* | 8/2020 | Adjakple | .......... | H04W 72/1226 |

OTHER PUBLICATIONS

"International Application Serial No. PCT/US2018/016491, International Search Report dated May 31, 2018", 3 pgs.
"International Application Serial No. PCT/US2018/016491, Written Opinion dated May 31, 2018", 9 pgs.
"Mobility type support for multiple beams in NR", Intel Corporation, R2-168512, 3GPP TSG RAN WG2 Meeting #96, Reno, USA, (Nov. 5, 2016), 6 pgs.
Ericsson, "Mobility between LTE and NR for inactive UEs", R2-168301, 3GPP TSG RAN WG2 Meeting #96, Reno, USA, (Nov. 5, 2016), 1-3.
Ericsson, "UE context handling during inter RAT handover", R2-168302, 3GPP TSG RAN WG2 Meeting #96, Reno, USA, (Nov. 5, 2016), 1-3.
Samsung, "Inter-RAT handover based on CN interface", R2-168868, 3GPP TSG RAN WG2 Meeting #96, Reno, USA, (Nov. 10, 2016).

* cited by examiner

GENERATION NODE-B (GNB), USER EQUIPMENT (UE) AND METHODS FOR HANDOVER BASED ON MULTI-CONNECTIVITY IN NEW RADIO (NR) SYSTEMS

PRIORITY CLAIM

This application is a U.S. National Stage Filing under 35 U.S.C. 371 from International Application No. PCT/US2018/016491, filed Feb. 1, 2018 and published in English as WO 2018/144758 on Aug. 9, 2018, which claims priority to United States Provisional Patent Application Ser. No. 62,453,969, filed Feb. 2, 2017, and to United States Provisional Patent Application Ser. No. 62,455,491, filed Feb. 6, 2017, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to usage of split bearers. Some embodiments relate to usage of multi-connectivity arrangements. Some embodiments relate to handover, including handover based on split bearers and/or handover based on multi-connectivity arrangements.

BACKGROUND

Base stations and mobile devices operating in a cellular network may exchange data. Various techniques may be used to improve capacity and/or performance, in some cases, including communication in accordance with new radio (NR) techniques. In an example, a mobile device at a cell edge may experience performance degradation and may benefit from a handover to another cell. An overall benefit to the system may also be realized as a result of the handover. Accordingly, there is a general need for methods and systems to perform operations related to handover in these and other scenarios.

BRIEF DESCRIPTION OF THE DRAWINGS

FIG. 13 is a functional diagram of another example network in accordance with some embodiments:

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
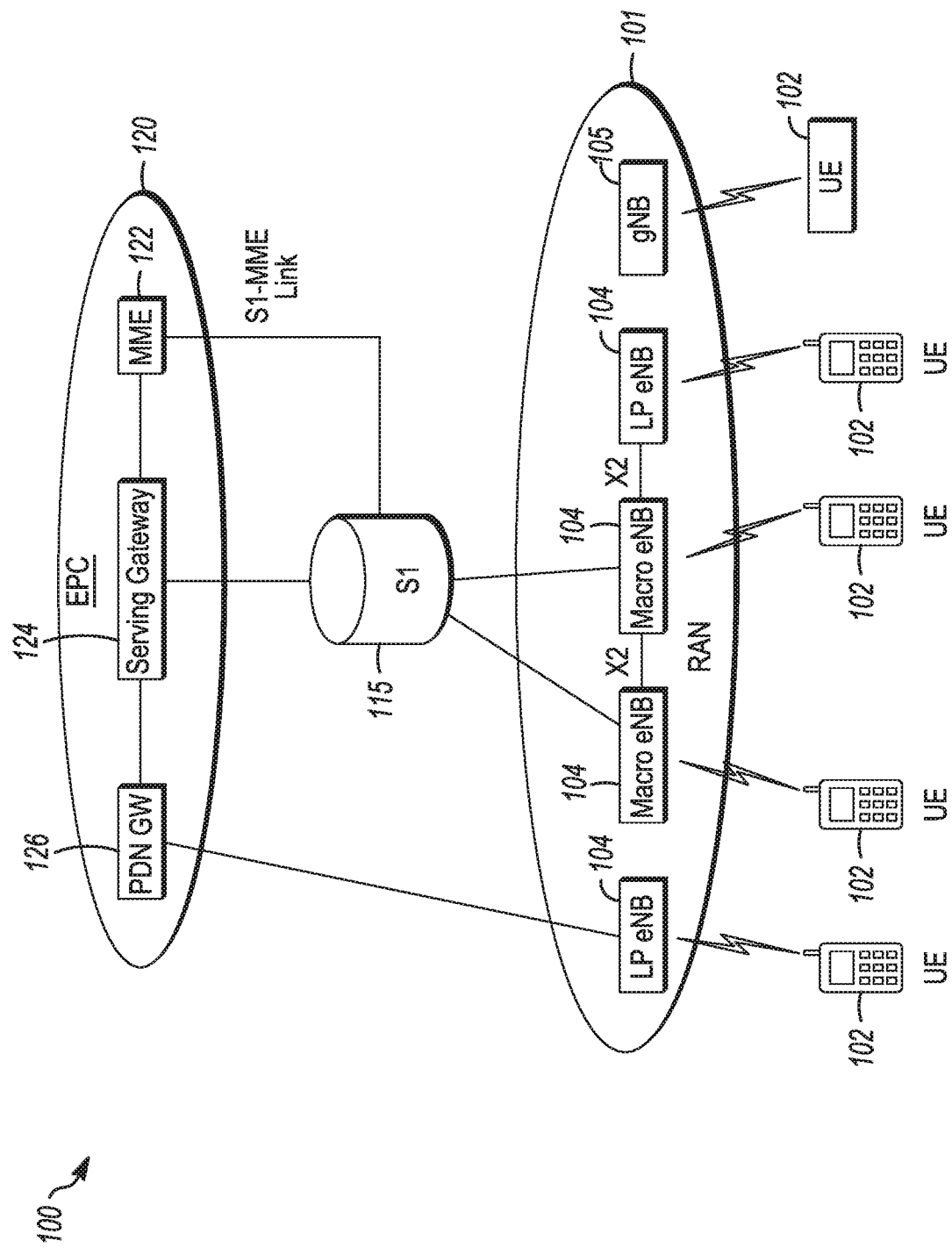
FIG. 1A is a functional diagram of an example network in accordance with some embodiments.
Figure 1B:
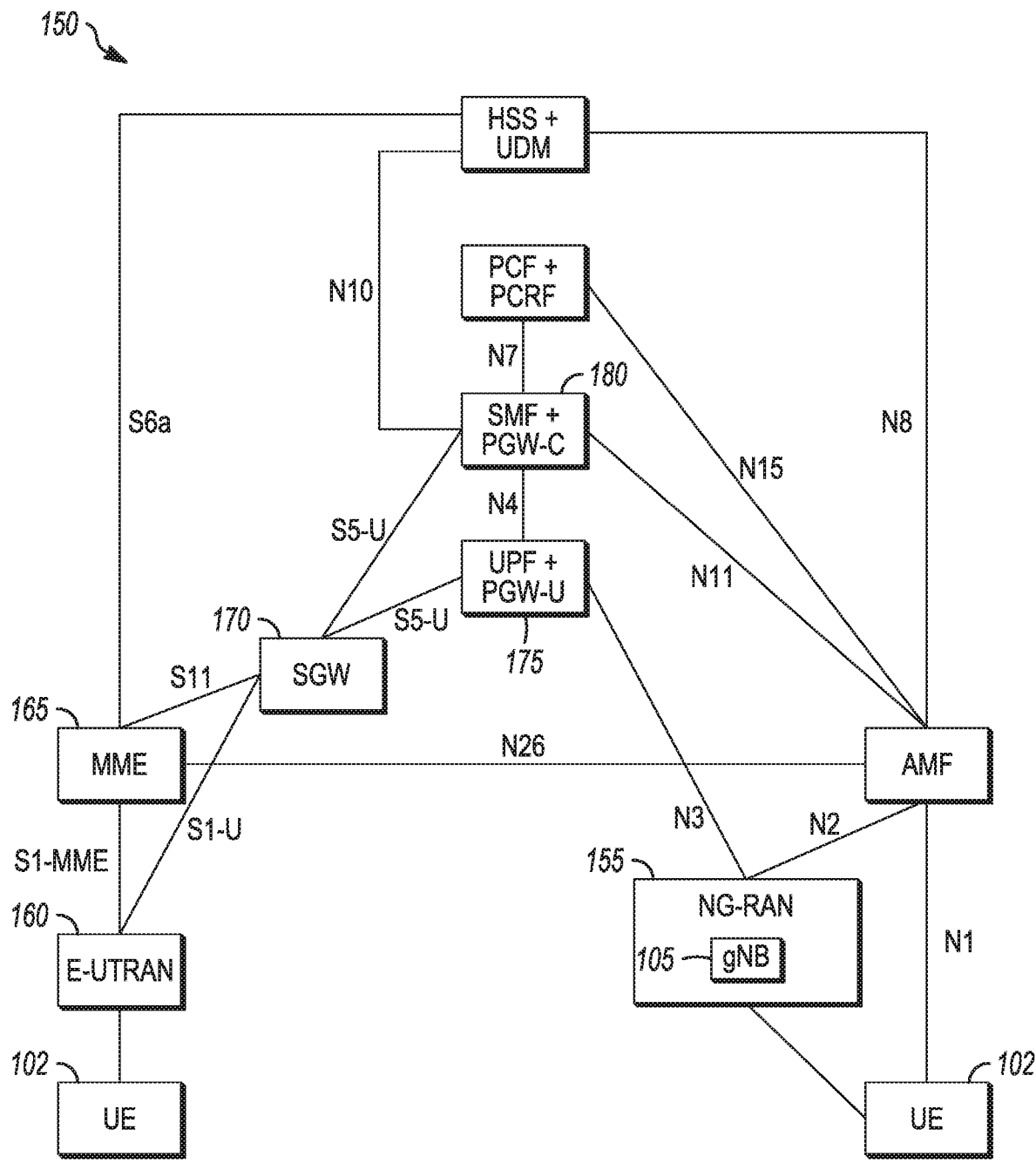

FIG. 1A is a functional diagram of an example network in accordance with some embodiments. FIG. 1B is a functional diagram of another example network in accordance with some embodiments. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including hut not limited to a gNB 105, an eNB 104, a serving cell, a transmit receive point (LRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The the component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
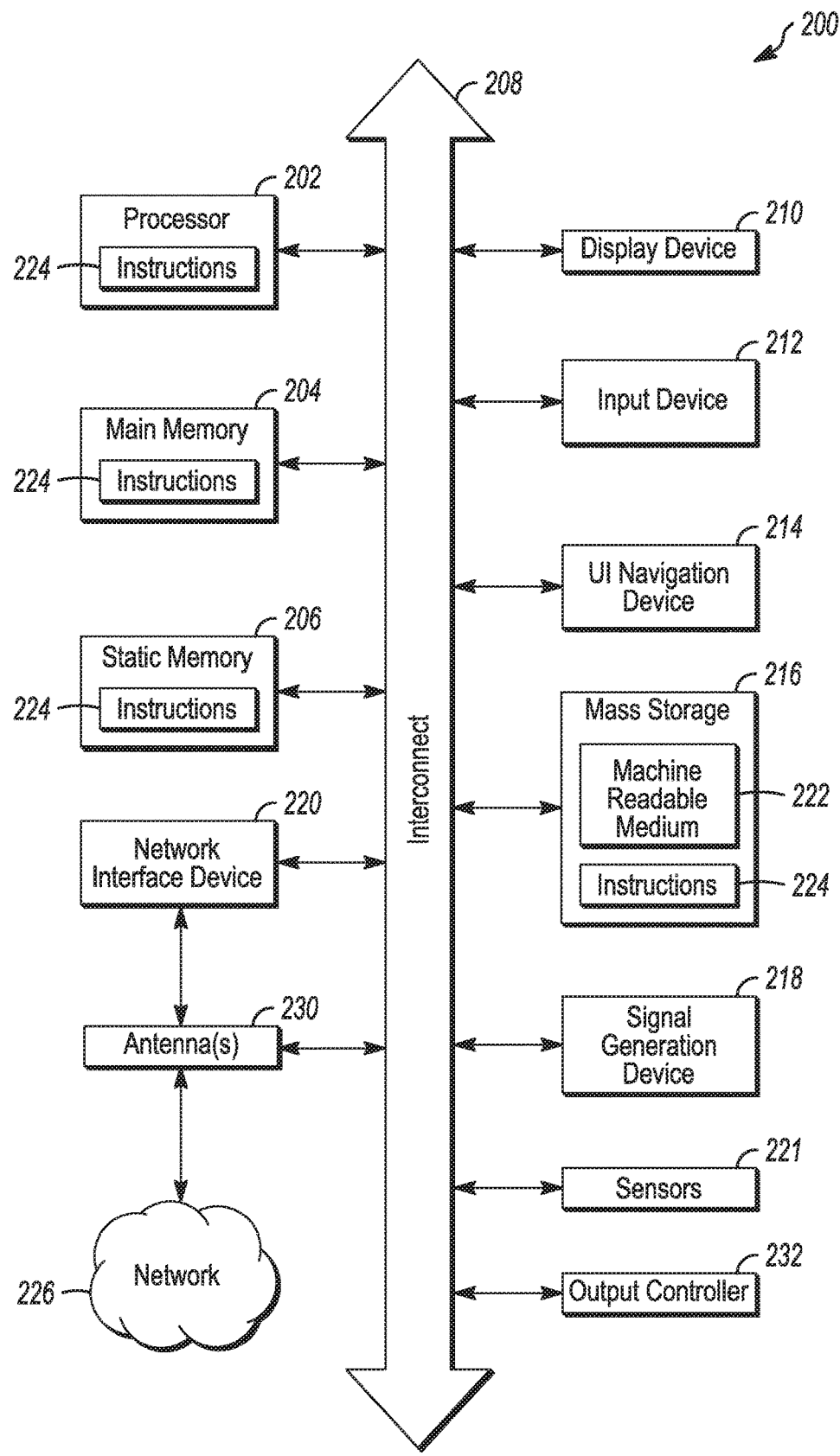
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of perforating specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared. (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO, multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
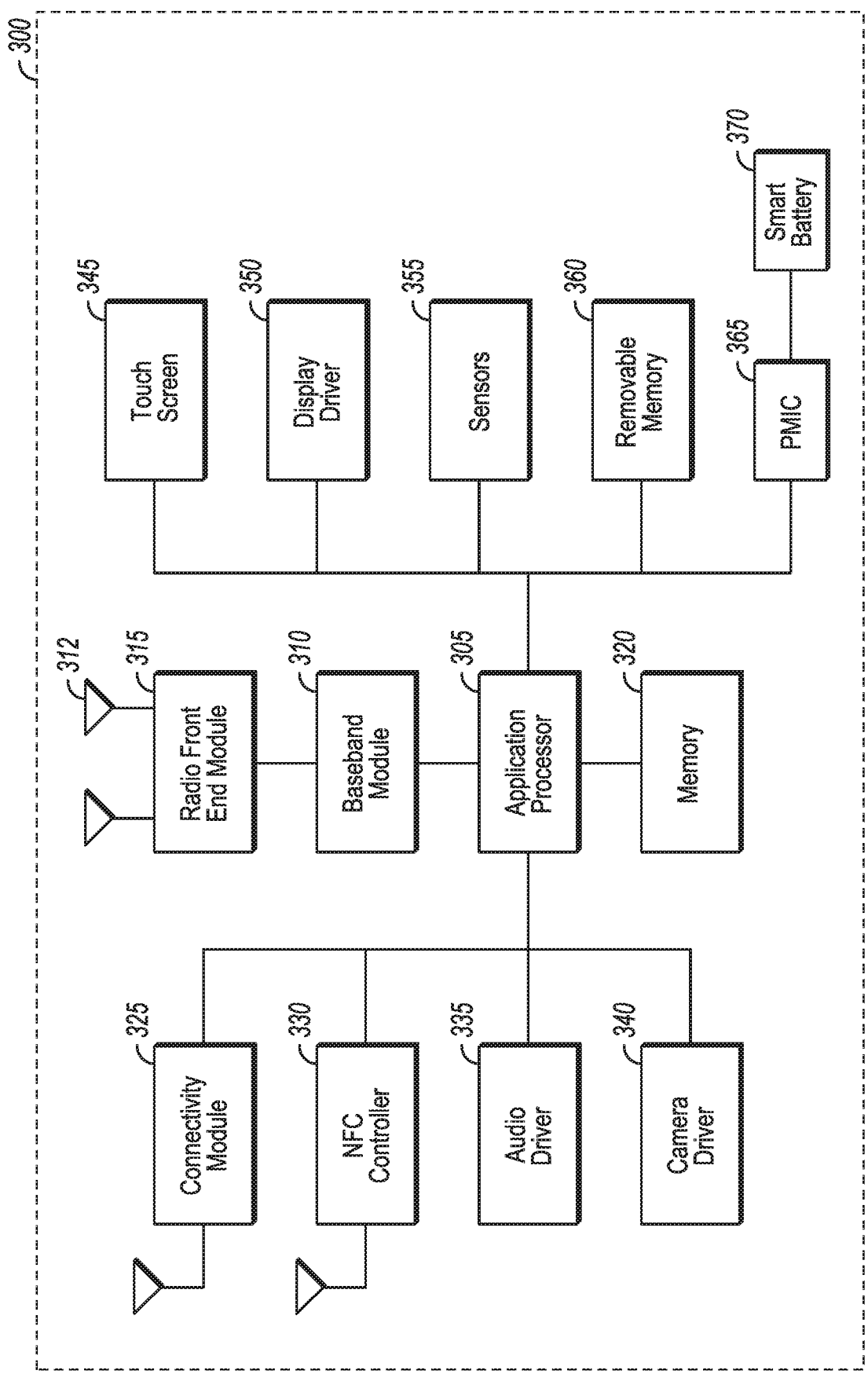
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
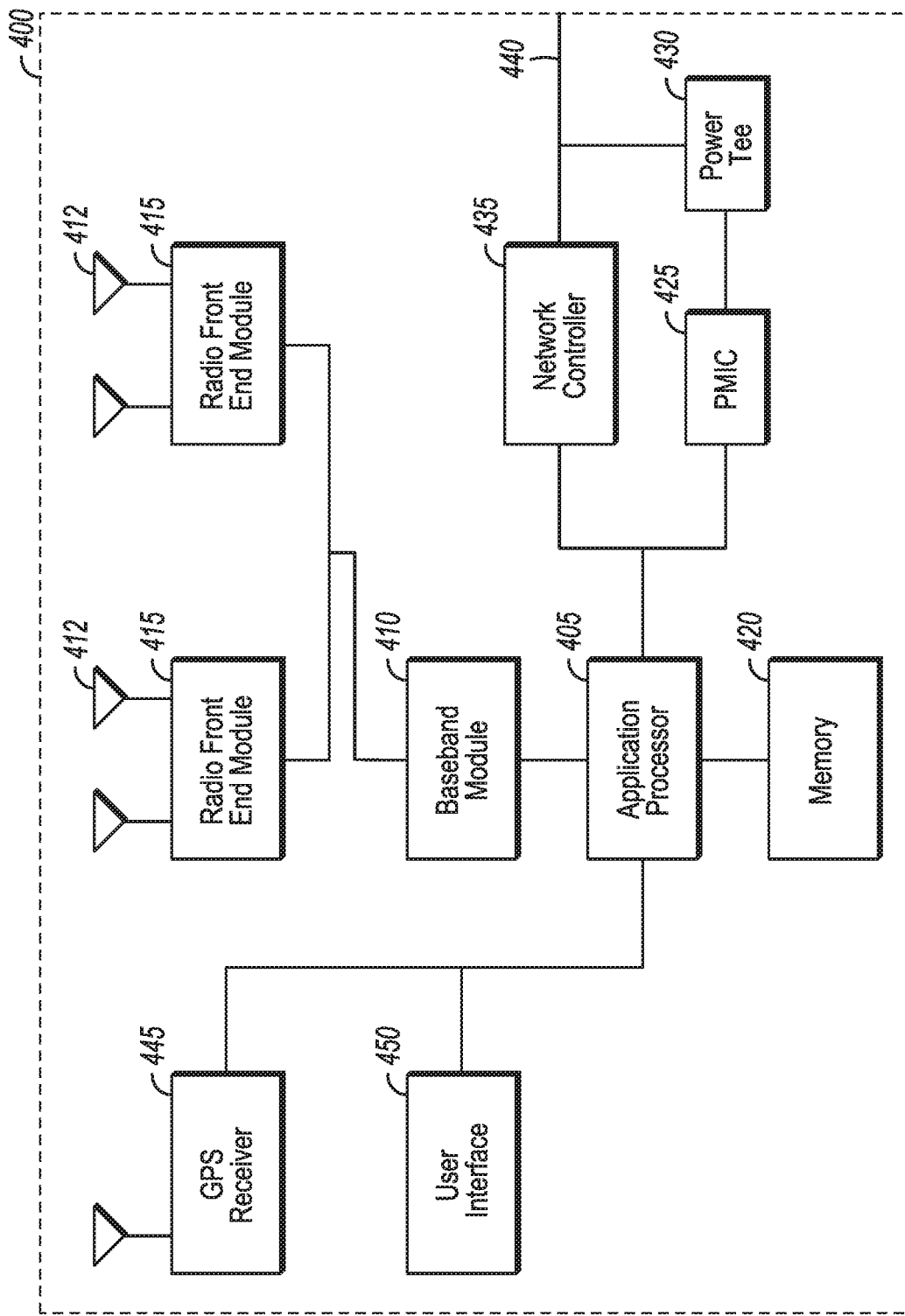
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved. Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
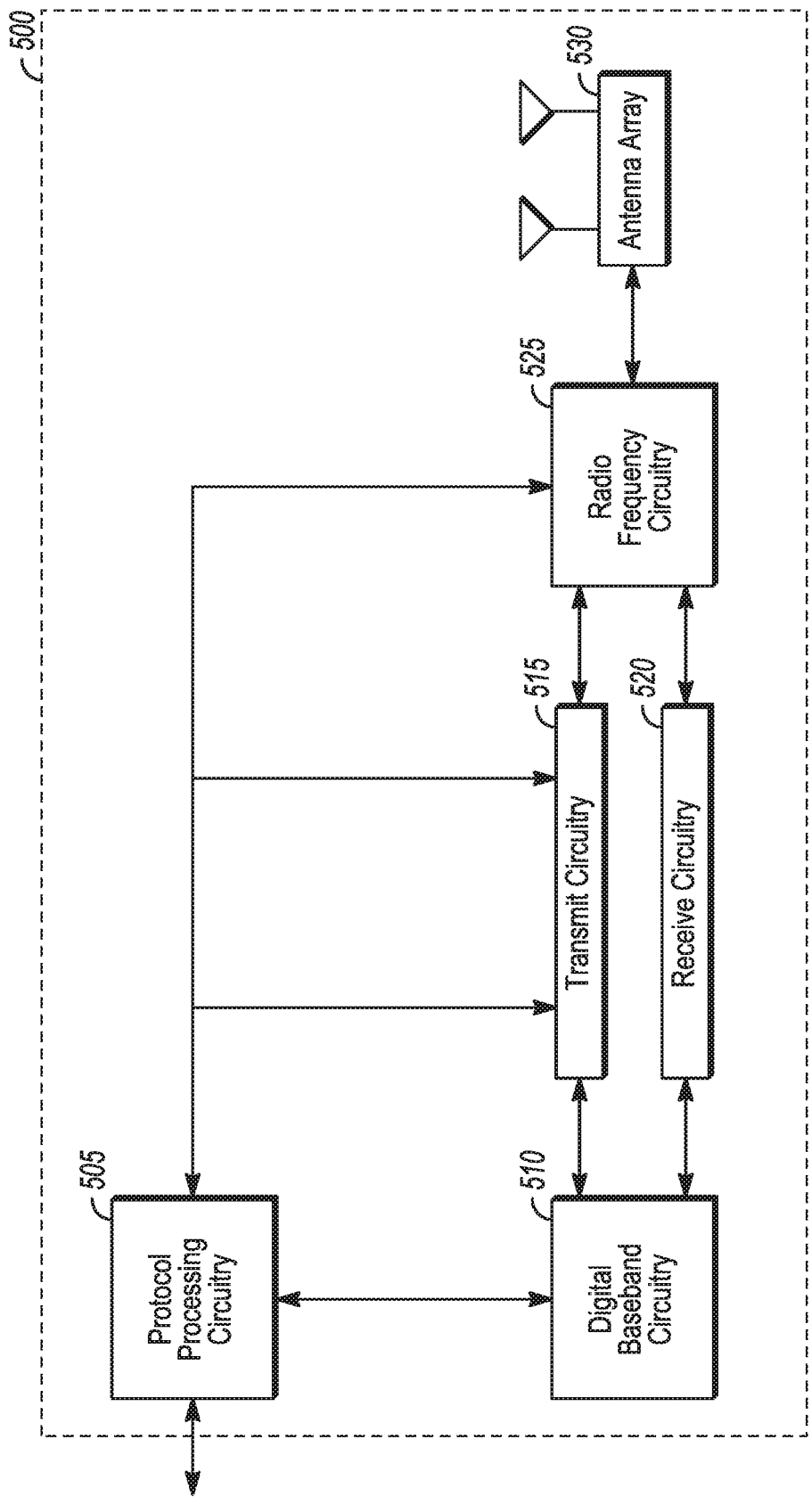
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (UM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, a target gNB 105 may receive, from a source gNB 105, a message for a handover of a UE 102 to the target gNB 105. The source gNB 105 may operate as a master gNB 105 (MgNB) before the handover. The message may indicate a request for the target gNB 105 to operate as a secondary gNB 105 (SgNB) before the handover. The message may further indicate a request for the target gNB 105 to operate as the MgNB 105 after the handover. The target gNB 105 may, as part of operation as the SgNB 105, transmit, to the UE 102, a first data packet received from the source gNB 105 for relay to the UE 102. The target gNB 105 may, as part of operation as the MgNB 105, transmit, to the UE 102, a second data packet received from a serving gateway (SGW) 124 for relay to the UE 102. These embodiments are described in more detail below.

Figure 6:
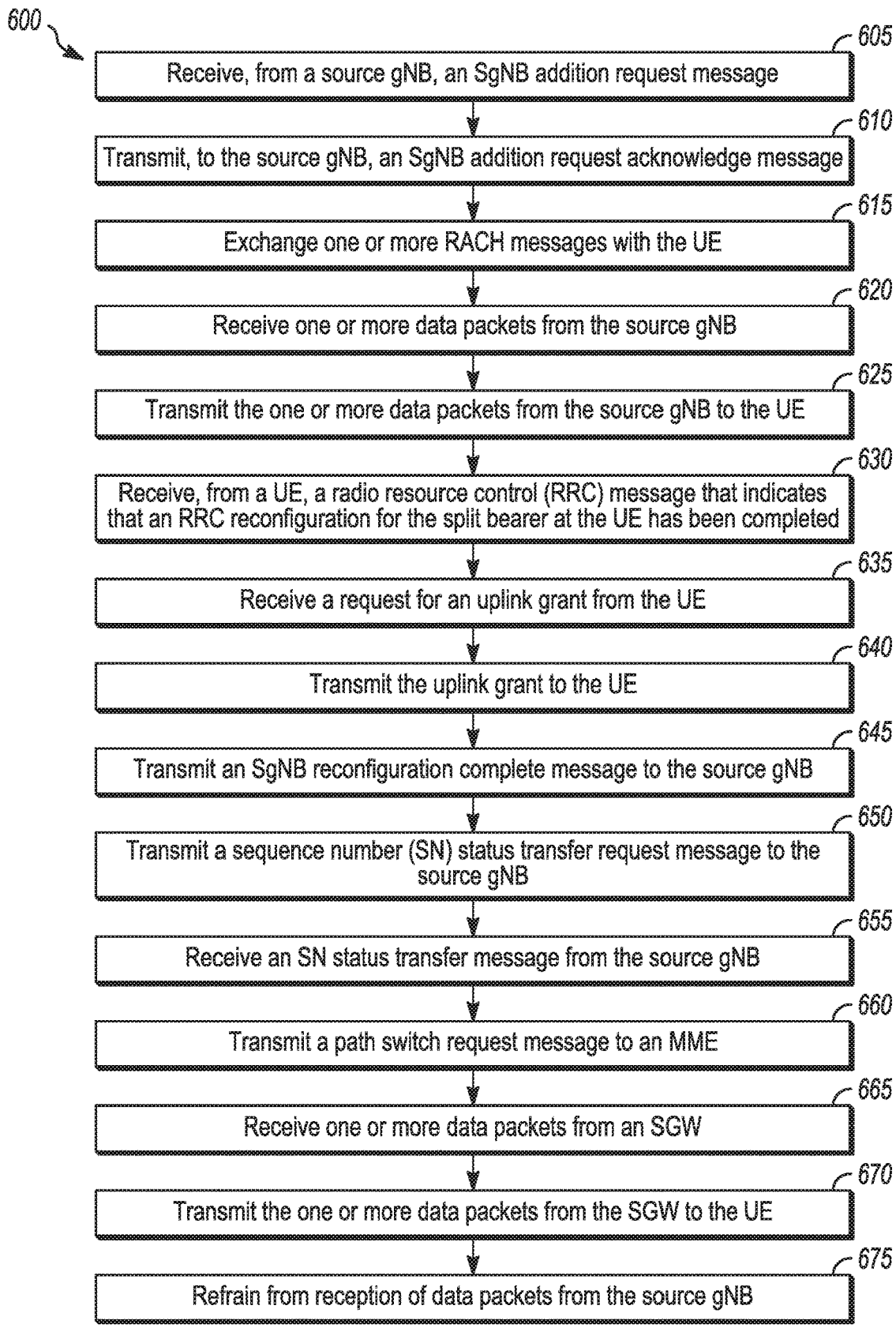
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to one or more of FIGS. 1A, 1B, 2-5 and 7-12, although it is understood that the method 600 may be practiced with any other suitable systems, interfaces and components.

In some embodiments, a gNB 105 may perform one or more operations of the method 600, but embodiments are not limited to performance of the method 600 and/or operations of it by the gNB 105. In some embodiments, an eNB 104 configured to operate as a gNB 105 may perform one or more operations of the method 600 (and/or similar operations). In some embodiments, an eNB 104 may perform one or more operations of the method 600 (and/or similar operations). In some embodiments, the UE 102 may perform one or more operations of the method 600 (and/or similar operations) Accordingly, although references may be made to performance of one or more operations of the method 600 by the gNB 105 in descriptions herein, it is understood that the eNB 104 and/or UE 102 may perform one or more of the same operations, in some embodiments. It is also understood that the eNB 104 and/or UE 102 may perform one or more similar operations, in some embodiments. It is also understood that the eNB 104 and/or UE 102 may perform one or more reciprocal operations, in some embodiments.

In some embodiments, the gNB 105 may be arranged to operate in accordance with a New Radio (NR) standard and/or protocol, although the scope of embodiments is not limited in this respect. While the method 600 and other methods described herein may refer to eNBs 104, gNBs 105 or UEs 102 operating in accordance with 3GPP standards, 5G standards, NR standards and/or other standards, embodiments of those methods are not limited to just those eNBs 104, gNBs 105 or UEs 102 and may also be practiced on other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11. The method 600 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In some embodiments, a gNB 105 configurable to operate as a target gNB 105 may perform one or more operations of the method 600, although the scope of embodiments is not limited in this respect. In descriptions herein, references to a target gNB, source gNB, master gNB (MgNB) and/or secondary gNB (SgNB) are not limiting, and may be used for clarity. In some embodiments, a gNB 105 may be configurable to operate as one or more of: a target gNB, a source gNB, an MgNB and an SgNB 105.

In some embodiments, the target gNB 105 may be arranged to operate in accordance with a New Radio (NR) protocol and/or standard, although the scope of embodiments is not limited in this respect.

At operation 605, the target gNB 105 may receive, from a source gNB 105, an SgNB addition request message. At operation 610, the target gNB 105 may transmit, to the source gNB 105, an SgNB addition request acknowledge message.

In some embodiments, the target gNB 105 may receive the SgNB addition request message for an establishment of a split bearer for a handover of a UE 102 to the target gNB 105, although the scope of embodiments is not limited in this respect. Embodiments are not limited to usage of the SgNB addition request message, as any suitable message may be used.

Although descriptions herein may refer to usage of a split bearer as part of a handover, embodiments are not limited to usage of a split bearer. In some embodiments, other multi-connectivity arrangements may be used. A split bearer is a non-limiting example of a multi-connectivity arrangement.

In some embodiments, the SgNB addition request message may indicate one or more of the following: that the source gNB 105 is to operate as a master gNB (MgNB) before the handover; a request for the target gNB 105 to operate as a secondary gNB (SgNB) before the handover; a request for the target gNB 105 to operate as the MgNB after the handover; and/or other information.

In some embodiments, the SgNB addition request message may indicate one or more of the following: that the source gNB 105 is to operate as a master gNB (MgNB) of the split bearer before the handover; a request for the target gNB 105 to operate as a secondary gNB (SgNB) of the split bearer before the handover; a request for the target gNB 105 to operate as the MgNB of the split bearer after the handover; and/or other information.

In a non-limiting example, as part of operation as an SgNB, a gNB 105 may receive one or more data packets from the MgNB for relay to the UE 102, and may transmit the one or more data packets to the UE 102. As part of operation as the MgNB, a gNB 105 may receive one or more data packets from the SGW 124, may transmit at least a first portion of those packets to the UE 102, and may transmit at least a second portion of those packets to the SgNB for relay to the UE 102.

Embodiments are not limited to usage of the SgNB addition request acknowledge message, as any suitable message may be used. In some embodiments, the SgNB addition request acknowledge message may include one or more of: a cell radio network temporary identifier (C-RNTI) to identify the UE 102 in a random access channel (RACH) procedure between the UE 102 and the target gNB 105; a security algorithm identifier of the target gNB 105; and/or other information.

At operation 615, the target gNB 105 may exchange one or more random access channel (RACH) messages with the UE 102. For instance, the target gNB 105 may transmit one or more RACH messages to the UE 102 and/or receive one or more RACH messages from the UE 102. In some embodiments, the exchange of the RACH messages may be part of a RACH procedure, although the scope of embodiments is not limited in this respect. In some embodiments, the target gNB 105 may perform one or more of the following: attempt to detect a RACH preamble from the UE 102; transmit a RACH message that indicates reception of the RACH preamble; and/or other operation related to exchange of RACH messages. A C-RNTI may be used to identify the UE 102 in the exchange of the RACH messages, in some embodiments. The C-RNTI may be included in any suitable message, such as the message of operation 610 and/or other message described below.

At operation 620, the target gNB 105 may receive one or more data packets from the source gNB 105. In some embodiments, the target gNB 105 may receive one or more data packets from the source gNB 105 for relay to the UE 102, although the scope of embodiments is not limited in this respect. In some embodiments, the target gNB 105 may receive one or more data packets from the source gNB 105 for relay to the UE 102 on the split bearer, although the scope of embodiments is not limited in this respect. At operation 625, the target gNB 105 may transmit, to the UE 102, the one or more data packets received from the source gNB 105 at operation 620. In some embodiments, operation 620 and/or 625 may be performed before the handover occurs, although the scope of embodiments is not limited in this respect.

At operation 630, the target gNB 105 may receive, from the UE, a radio resource control (RRC) message. In some embodiments, the RRC message may indicate that an RRC reconfiguration at the UE 102 has been completed. In some embodiments, the RRC message may indicate that an RRC reconfiguration for the split bearer at the UE 102 has been completed.

At operation 635, the target gNB 105 may receive, from the UE 102, a request for an uplink grant. At operation 640, the target gNB 105 may transmit the uplink grant to the UE 102. Non-limiting examples of techniques that may be used for operation 635 and/or 640 are given below. In some embodiments, one or more of the techniques may be used. In some embodiments, a combination of two or more of the techniques (in whole or in part) may be used.

In a non-limiting example, the target gNB 105 may receive, from the UE 102, a buffer status report (BSR) to request an uplink grant for communication to the target gNB 105. The target gNB 105 may transmit the uplink grant to the UE 102.

In another non-limiting example, the target gNB 105 may receive, from the UE 102, a request for an uplink grant for communication to the target gNB 105 on a signaling radio bearer (SRB). The target gNB 105 may transmit, to the UE 102, a handover command that includes the uplink grant.

In another non-limiting example, the target gNB 105 may receive, from the UE 102, a request for an uplink grant for communication to the target gNB 105 on a signaling radio bearer (SRB). The target gNB 105 may transmit, to the UE 102, a physical downlink control channel (PDCCH) that includes the uplink grant.

In another non-limiting example, the target gNB 105 may receive, from the UE 102, a buffer status report (BSR) to request an uplink grant for communication to the target gNB 105 on an SRB. A bit field of one or more bits in the BSR may indicate that the BSR is intended for the target gNB 105. The target gNB 105 may transmit the uplink grant to the UE 102.

In another non-limiting example, the target gNB 105 may receive, from the UE 102, a request for an uplink grant for communication to the target gNB 105 on an SRB. The target gNB 105 may transmit, to the UE 102, an RRC message that indicates one or more of: the uplink grant; that the target gNB 105 has begun operation as the MgNB, that the target gNB 105 has begun operation as the MgNB of the split bearer; and/or other information.

In another non-limiting example, the target gNB 105 may determine a C-RNTI to identify the UE 102 after the handover is completed. The target gNB 105 may transmit, to the UE, one or more of: an RRC message that includes the C-RNTI, a handover command that includes the C-RNTI; another message that includes the C-RNTI.

At operation 645, the target gNB 105 may transmit a SgNB reconfiguration complete message to the source gNB 105. In some embodiments, the SgNB reconfiguration complete message may indicate a successful addition as the SgNB. In some embodiments, the successful addition may be based at least partly on the reception of the RACH preamble, although the scope of embodiments is not limited in this respect. Embodiments are not limited to usage of the SgNB reconfiguration complete message, as any suitable message may be used.

At operation 650, the target gNB 105 may transmit a sequence number (SN) status transfer request message to the source gNB 105. At operation 655, the target gNB 105 may receive an SN status transfer message from the source gNB 105. Embodiments are not limited to usage of the SN) status transfer request message and/or SN status transfer message, as any suitable message(s) may be used.

In some embodiments, the SN status transfer request message may indicate a highest SN of data packets received from the source gNB 105 for relay to the UE 102. For instance, of the data packets received from the source gNB 105 for relay to the UE 102, a highest SN may be indicated. It should be noted that the SN may be based on a bit field that may "roll over" after a maximum number is realized, and this may be taken into account to define the "highest SN." For instance, after an SN of 1111 is assigned to a data packet, a next data packet may be assigned an SN of 0000. In some embodiments, the SN status transfer message may indicate a starting SN for subsequent data packets. For instance, an SN of a next data packet may be indicated. In some embodiments, the SN status transfer message may indicate a starting SN for subsequent data packets on the split bearer.

At operation 660, the target gNB 105 may transmit, to a mobility management entity (MME) 122, a path switch request message. In some embodiments, the path switch request message may indicate a request for the SGW 124 to transmit subsequent data packets to the target gNB 105 as part of the handover. In some embodiments, the path switch request message may indicate a request for the SGW 124 to transmit subsequent data packets for the split bearer to the target gNB 105 as part of the handover. In some embodiments, the path switch request message may be transmitted at least partly in response to reception of the RRC message from the UE 102 at operation 630.

At operation 665, the target gNB 105 may receive one or more data packets from the SGW 124. At operation 670, the target gNB 105 may transmit the one or more data packets to the UE 102. At operation 675, the target gNB 105 may refrain from reception of data packets from the source gNB 105. In some embodiments, the target gNB 105 may refrain from reception of data packets from the source gNB 105 for relay to the UE 102. One or more of the operations 665-675 may be performed after the handover, although the scope of embodiments is not limited in this respect.

One or more of the messages described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, an apparatus of a gNB 105 may comprise memory. The memory may be configurable to store at least a portion of the SgNB addition request message. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to decoding of the SgNB addition request message. The apparatus of the gNB 105 may include a transceiver to receive the SgNB addition request message. The transceiver may transmit and/or receive other blocks, messages and/or other elements.

Figure 7:
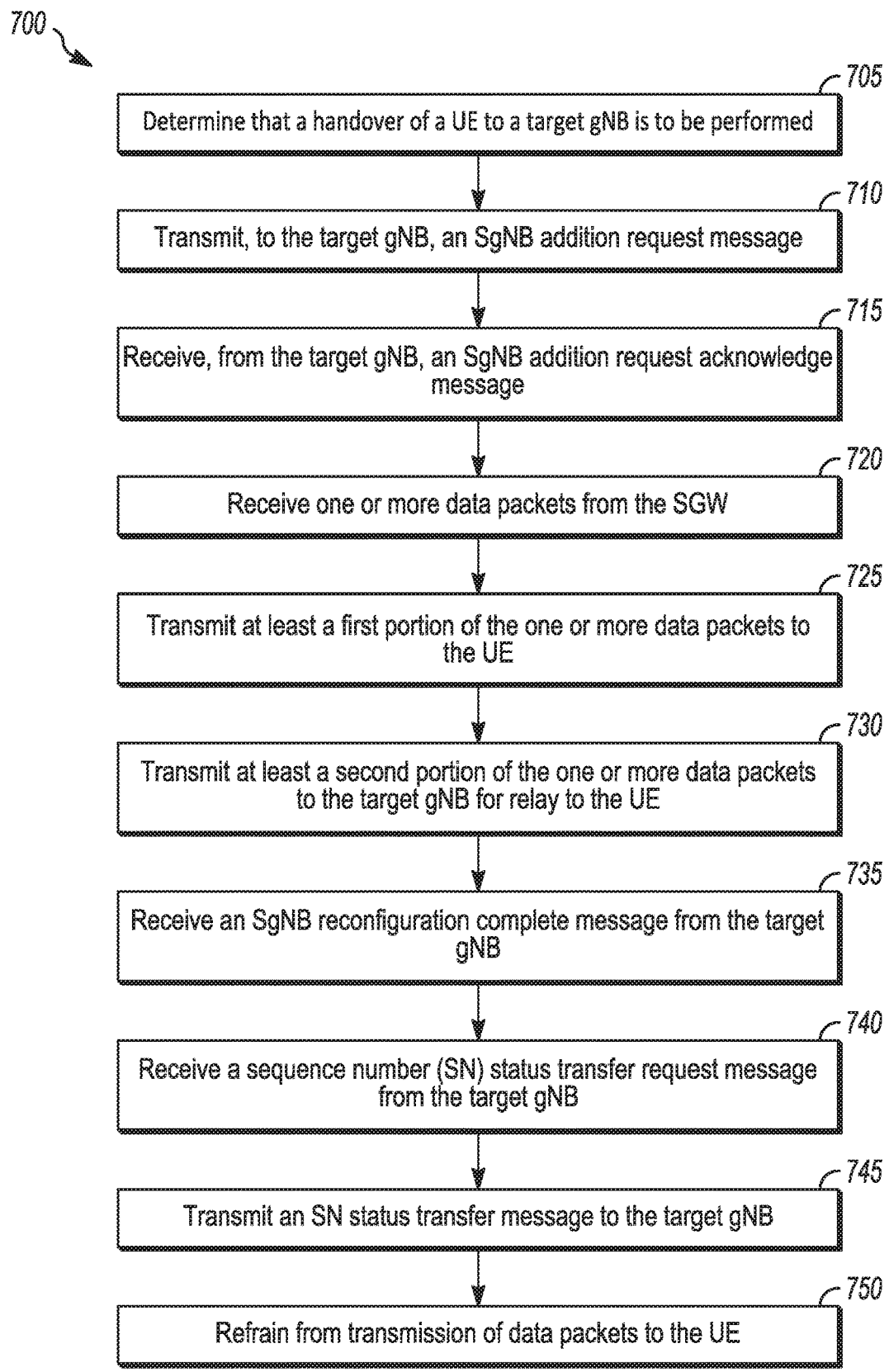
FIG. 7 illustrates the operation of another method of communication in accordance with some embodiments.
Figure 8:
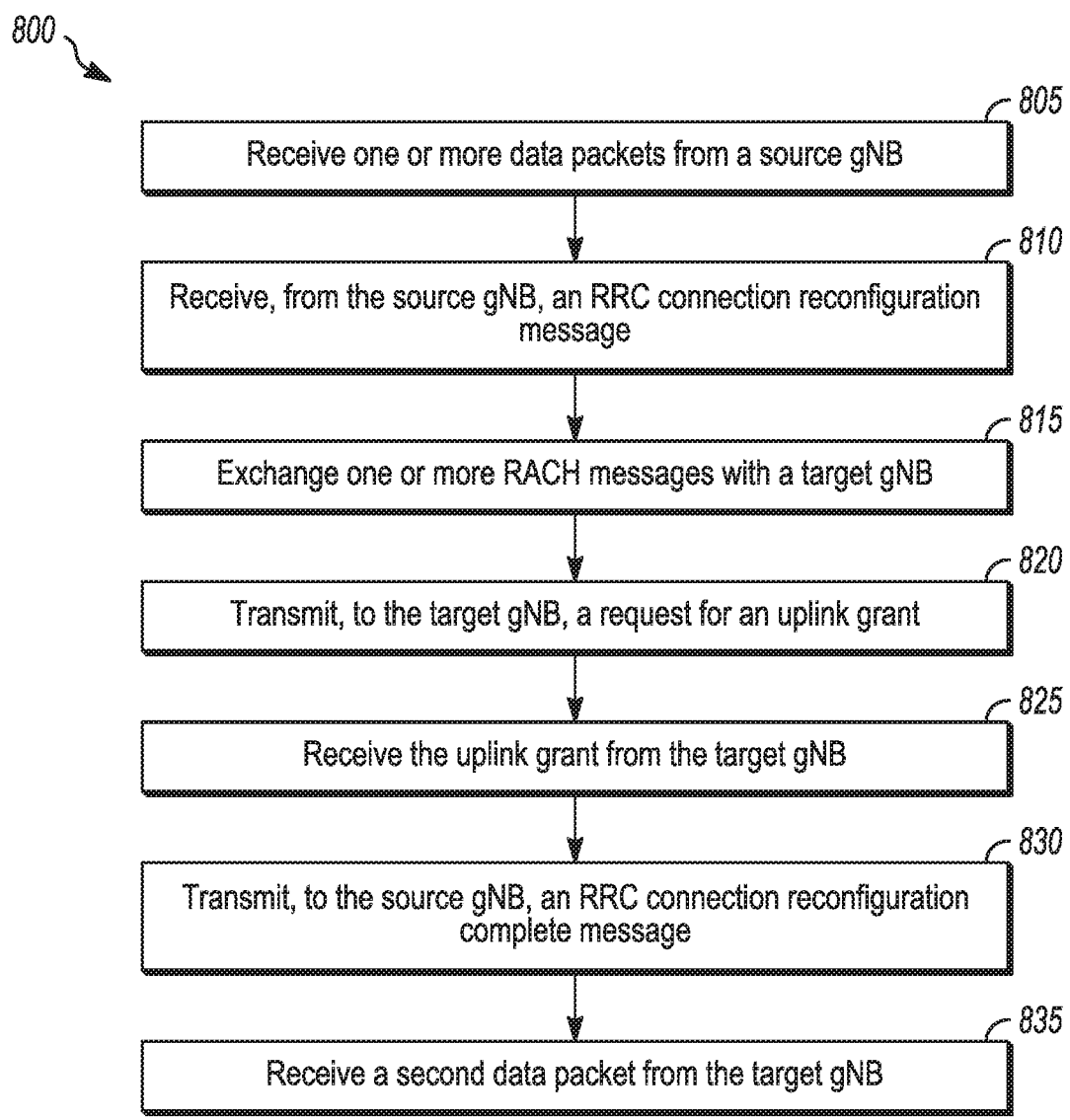
FIG. 8 illustrates the operation of another method of communication in accordance with some embodiments.

FIG. 7 illustrates the operation of another method of communication in accordance with some embodiments. FIG. 8 illustrates the operation of another method of communication in accordance with some embodiments. Embodiments of the methods 700 and 800 may include additional or even fewer operations or processes in comparison to what is illustrated in FIGS. 7-8 and embodiments of the methods 700 and/or 800 are not necessarily limited to the chronological order that is shown in FIGS. 7-8. In describing the methods 700 and/or 800, reference may be made to one or more of the figures described herein, although it is understood that the methods 700 and/or 800 may be practiced with any other suitable systems, interfaces and components. In addition, embodiments of the methods 700 and/or 800 may be applicable to UEs 102, eNBs 104, gNBs 105, APs, STAB and/or other wireless or mobile devices. The methods 700 and/or 800 may also be applicable to an apparatus of a UE 102, eNB 104, gNB 105 and/or other device described above.

In some embodiments, a gNB 105 (including but not limited to a gNB 105 configurable to operate as a source gNB 105) may perform one or more operations of the method 700, but embodiments are not limited to performance of the method 700 and/or operations of it by the gNB 105. In some embodiments, the eNB 104 and/or UE 102 may perform one or more operations of the method 700 (and/or similar operations). Although references may be made to performance of one or more operations of the method 800 by the gNB 105 (and/or source gNB 105) in descriptions herein, it is understood that the eNB 104 and/or UE 102 may perform the same operation(s), similar operation(s) and/or reciprocal operation(s), in some embodiments.

In some embodiments, a UE 102 may perform one or more operations of the method 800, but embodiments are not limited to performance of the method 800 and/or operations of it by the UE 102. In some embodiments, the eNB 104 and/or gNB 105 may perform one or more operations of the method 800 (and/or similar operations). Although references may be made to performance of one or more operations of the method 800 by the UE 102 in descriptions herein, it is understood that the eNB 104 and/or gNB 105 may perform the same operation(s), similar operation(s) and/or reciprocal operation(s), in some embodiments.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) from the target gNB 105 to a source gNB 105, and an operation of the method 700 may include reception of a same element (and/or similar element) from the target gNB 105 by the source gNB 105. In some cases, descriptions of operations and techniques described as part of one of the methods 600, 700, 800 may be relevant to one or both of the other methods.

In addition, previous discussion of various techniques and concepts may be applicable to the methods 700 and/or 800 in some cases, including but not limited to handover, target gNB 105, source gNB 105, MgNB, SgNB, split bearer, multi-connectivity arrangements, messages (including but not limited to messages described regarding the method 600) and/or other. In addition, the examples shown in one or more of the figures may also be applicable, in some cases, although the scope of embodiments is not limited in this respect.

In some embodiments, a gNB 105 configurable to operate as a source gNB 105 may perform one or more operations of the method 700, although the scope of embodiments is not limited in this respect. In some embodiments, the source gNB 105 may be arranged to operate in accordance with a New Radio (NR) protocol and/or standard, although the scope of embodiments is not limited in this respect.

At operation 705, the source gNB 105 may determine that a handover of a User Equipment (UE) to a target gNB is to be performed. In some embodiments, the source gNB 105 may determine that the handover is to be performed based at least partly on one or more of: a first signal quality measurement for a first link between the UE 102 and the source gNB 105, and a second signal quality measurement for a second link between the UE 102 and the target gNB 105. Example signal quality measurements include, but are not limited to, signal-to-noise ratio (SNR), reference signal received power (RSRP), reference signal received quality (RSRQ), and received signal strength indicator (RSSI).

At operation 710, the source gNB 105 may transmit, to the target gNB, an SgNB addition request message. At operation 715, the source gNB 105 may receive, from the target gNB, an SgNB addition request acknowledge message. At operation 720, the source gNB 105 may receive one or more data packets from the SGW 124. At operation 725, the source gNB 105 may transmit at least a first portion of the one or more data packets to the UE 102. At operation 730, the source gNB 105 may transmit at least a second portion of the one or more data packets to the target gNB 105 for relay to the UE 102. At operation 735, the source gNB 105 may receive an SgNB reconfiguration complete message from the target gNB 105. At operation 740, the source gNB 105 may receive a sequence number (SN) status transfer request message from the target gNB 105. At operation 745, the source gNB 105 may transmit an SN status transfer message to the target gNB 105. At operation 750, the source gNB 105 may refrain from transmission of data packets to the UE 102. Embodiments are not limited to the messages described in FIG. 7, as other suitable message(s) may be used, in some embodiments.

In some embodiments, one or more of operations 720-730 may be performed before the handover, although the scope of embodiments is not limited in this respect. In some embodiments, operation 750 may be performed after the handover, although the scope of embodiments is not limited in this respect.

In some embodiments, the source gNB 105 may determine that a handover of a UE 102 to a target gNB 105 is to be performed. The source gNB 105 may transmit, to the target gNB 105, an SgNB addition request message for an establishment of a split bearer for the handover. The source gNB 105 may operate as a master gNB (MgNB) of the split bearer. The SgNB addition request message may indicate one or more of a request for an addition of the target gNB 105 to the split bearer as a secondary gNB (SgNB); and that the target gNB 105 is to operate as the MgNB of the split bearer after the handover. The source gNB 105 may receive, from the target gNB 105, an SgNB addition request acknowledge message that indicates a successful addition of the target gNB 105 as the SgNB of the split bearer. The source gNB 105 may refrain from transmission of data packets to the UE 102 on the split bearer. In some embodiments, the source gNB 105 may refrain from transmission of data packets to the UE 102 on the split hearer based on the successful addition of the target gNB 105 as the SgNB, although the scope of embodiments is not limited in this respect.

In some embodiments, an MgNB 105 may transmit a first data packet to the UE 102 on a split bearer and may transmit a second data packet to an SgNB 105 of the split bearer for relay to the UE 102. The MgNB 105 may determine that a handover of the UE 102 to the SgNB 105 is to be performed. In some embodiments, the MgNB 105 may determine that the handover is to be performed based at least partly on one or more of: a first signal quality measurement for a first link between the UE 102 and the MgNB 105; and a second signal quality measurement for a second link between the UE 102 and the SgNB 105. The MgNB may transmit, to the SgNB 105, a handover request message that indicates that the handover is to be performed and further indicates that the SgNB 105 is to operate as the MgNB 105 of the split bearer after the handover. The MgNB may refrain from transmission of data packets to the UE 102 on the split radio bearer after the handover.

In some embodiments, the source gNB 105 may determine that a handover of a UE 102 to a target gNB 105 is to be performed. The source gNB 105 may transmit, to the target gNB 105, an SgNB addition request message for the handover. The source gNB 105 may operate as a master gNB (MgNB). The SgNB addition request message may indicate one or more of: a request for an addition of the target gNB 105 as a secondary gNB (SgNB); and that the target gNB 105 is to operate as the MgNB after the handover. The source gNB 105 may receive, from the target gNB 105, an SgNB addition request acknowledge message that indicates a successful addition of the target gNB 105 as the SgNB. The source gNB 105 may refrain from transmission of data packets to the UE 102. In some embodiments, the source gNB 105 may refrain from transmission of data packets to the UE 102 based on the successful addition of the target gNB 105 as the SgNB, although the scope of embodiments is not limited in this respect.

In some embodiments, an MgNB 105 may transmit a first data packet to the UE 102 and may transmit a second data packet to an SgNB 105 for relay to the UE 102. The MgNB 105 may determine that a handover of the UE 102 to the SgNB 105 is to be performed. In some embodiments, the MgNB 105 may determine that the handover is to be performed based at least partly on one or more of: a first signal quality measurement for a first link between the UE 102 and the MgNB 105; and a second signal quality measurement for a second link between the UE 102 and the SgNB 105. The MgNB may transmit, to the SgNB 105, a handover request message that indicates that the handover is to be performed and further indicates that the SgNB 105 is to operate as the MgNB 105 after the handover. The MgNB may refrain from transmission of data packets to the UE 102 after the handover.

In some embodiments, a UE 102 may perform one or more operations of the method 800, although the scope of embodiments is not limited in this respect. In some embodiments, the UE 102 may be arranged to operate in accordance with a New Radio (NR) protocol and/or standard, although the scope of embodiments is not limited in this respect.

At operation 805, the UE 102 may receive a first data packet from a source gNB 105. At operation 810, the UE 102 may receive, from the source gNB 105, an RRC connection reconfiguration message. At operation 815, the UE 102 may exchange one or more RACH messages with a target gNB 105. At operation 820, the UE 102 may transmit, to the target gNB 105, a request for an uplink grant. At operation 825, the UE 102 may receive the uplink grant from the target gNB 105. At operation 830, the UE 102 may transmit, to the source gNB, an RRC connection reconfiguration complete message. At operation 835, the UE 102 may receive a second data packet from the target gNB 105.

In some embodiments, the UE 102 may receive, from the source gNB 105, a first data packet. The UE 102 may receive, from the source gNB 105, a first message that indicates one or more of: a handover of the UE 102 to a target gNB 105; a security parameter to be used by the UE 102 for communication with the target gNB 105; an establishment of a split bearer for a handover of the UE 102 to a target gNB 105; a security parameter to be used by the UE 102 for communication with the target gNB 105 on the split bearer; and/or other information.

In some embodiments, the UE 102 may exchange one or more RACH messages with the target gNB 105 for a synchronization with the target gNB 105 for the split bearer. For instance, the UE 102 may transmit one or more RACH messages to the target gNB and/or receive one or more RACH messages from the target gNB 105. The UE 102 may, if the synchronization is successful: transmit, to the source gNB 105, a second message that indicates that the source gNB 105 is to refrain from transmission of data packets to the UE 102 on the split bearer. The UE 102 may receive, from the target gNB 105 on the split bearer, a second data packet in accordance with the security parameter included in the first message.

In some embodiments, the UE 102 may exchange one or more RACH messages with the target gNB 105 for a synchronization with the target gNB 105. For instance, the UE 102 may transmit one or more RACH messages to the target gNB and/or receive one or more RACH messages from the target gNB 105. The UE 102 may, if the synchronization is successful: transmit, to the source gNB 105, a second message that indicates that the source gNB 105 is to refrain from transmission of data packets to the UE 102. The UE 102 may receive, from the target gNB 105, a second data packet in accordance with the security parameter included in the first message In some embodiments, the UE 102 may transmit, to the target gNB 105, a buffer status report (BSR) to request an uplink grant for communication to the target gNB 105 on a signaling radio bearer (SRB). The UE 102 may receive, from the target gNB 105, the uplink grant. The UE 102 may transmit, to the target gNB 105, an RRC reconfiguration complete message. In some embodiments, the RRC reconfiguration complete message may indicate that an RRC reconfiguration at the UE 102 has been completed. In some embodiments, the RRC reconfiguration complete message may indicate that an RRC reconfiguration for the split bearer at the UE 102 has been completed. The RRC reconfiguration complete message may include at least one of: a predetermined SRB identifier (ID), and a predetermined logical channel ID.

In some embodiments, the UE 102 may transmit, to the target gNB 105, a BSR to request an uplink grant for communication to the target gNB 105 on an SRB. The UE 102 may receive, from the source gNB 105, the uplink grant. The UE 102 may transmit, to the target gNB 105, an RRC reconfiguration complete message. In some embodiments, the RRC reconfiguration complete message may indicate that an RRC reconfiguration at the UE 102 has been completed. In some embodiments, the RRC reconfiguration complete message may indicate that an RRC reconfiguration for the split bearer at the UE 102 has been completed.

Figure 9:
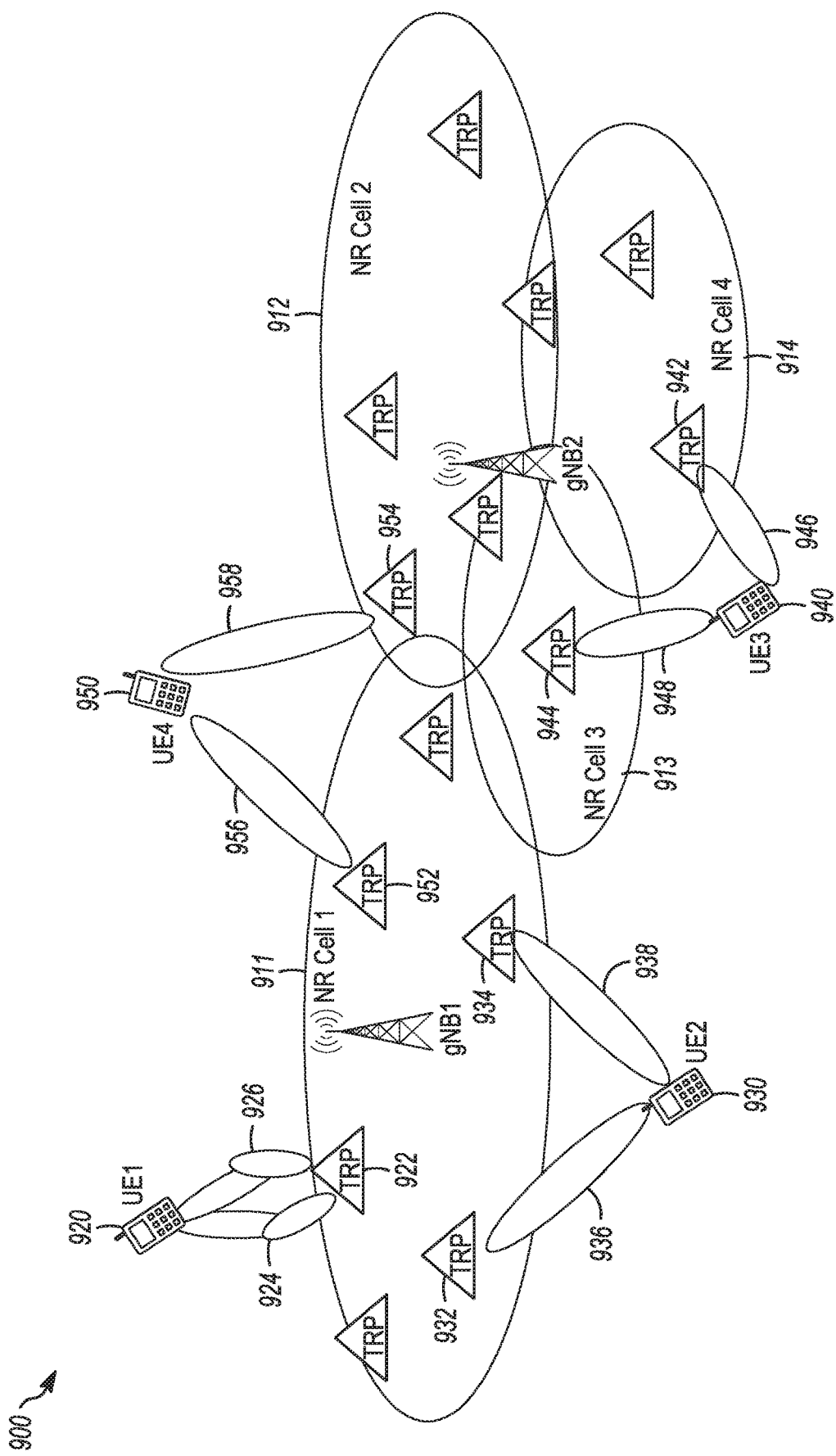
FIG. 9 illustrates examples of dual connectivity (DCC) in accordance with some embodiments.
Figure 10A:
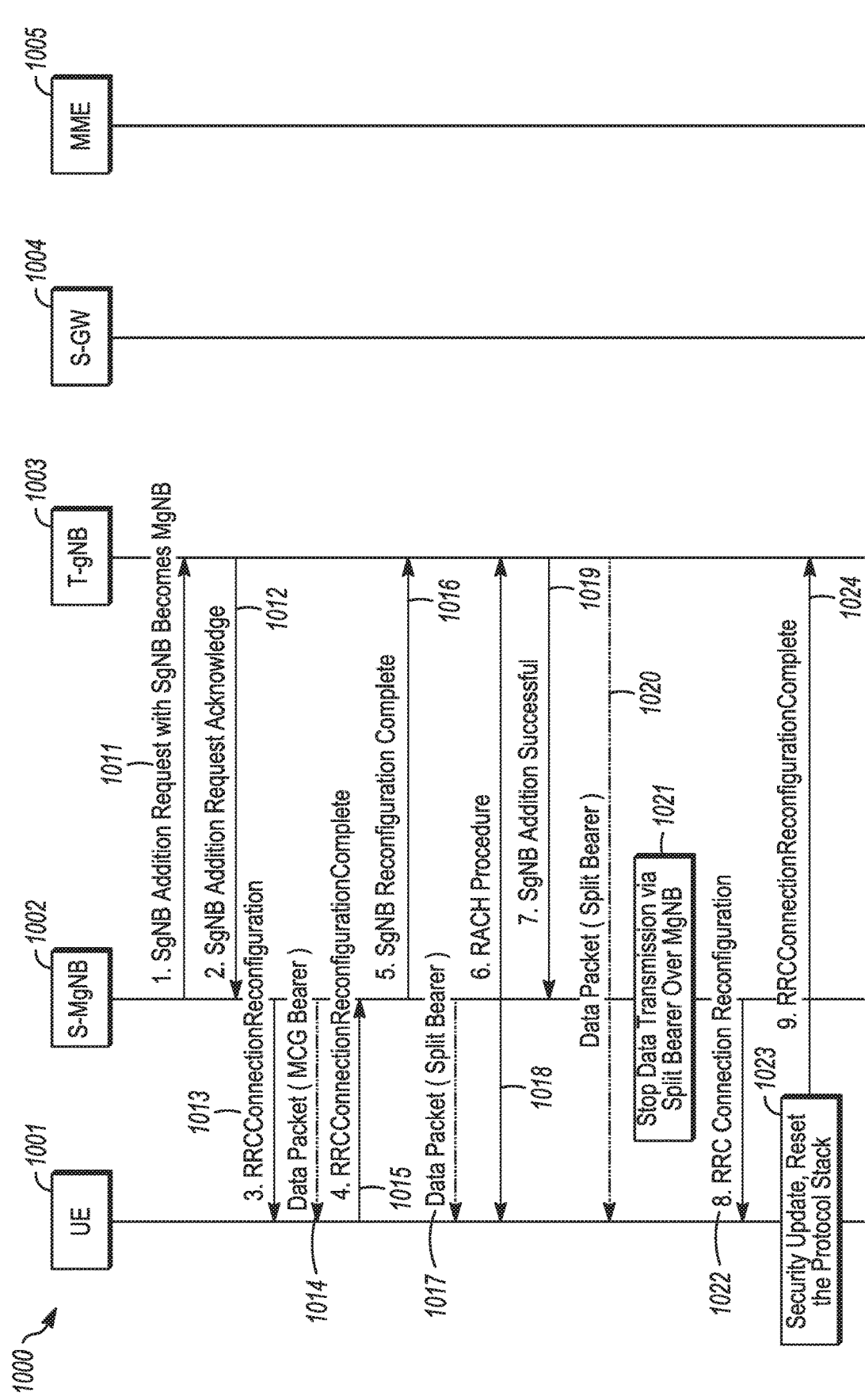
FIGS. 10A-B illustrate example operations in accordance with some embodiments.
Figure 10B:
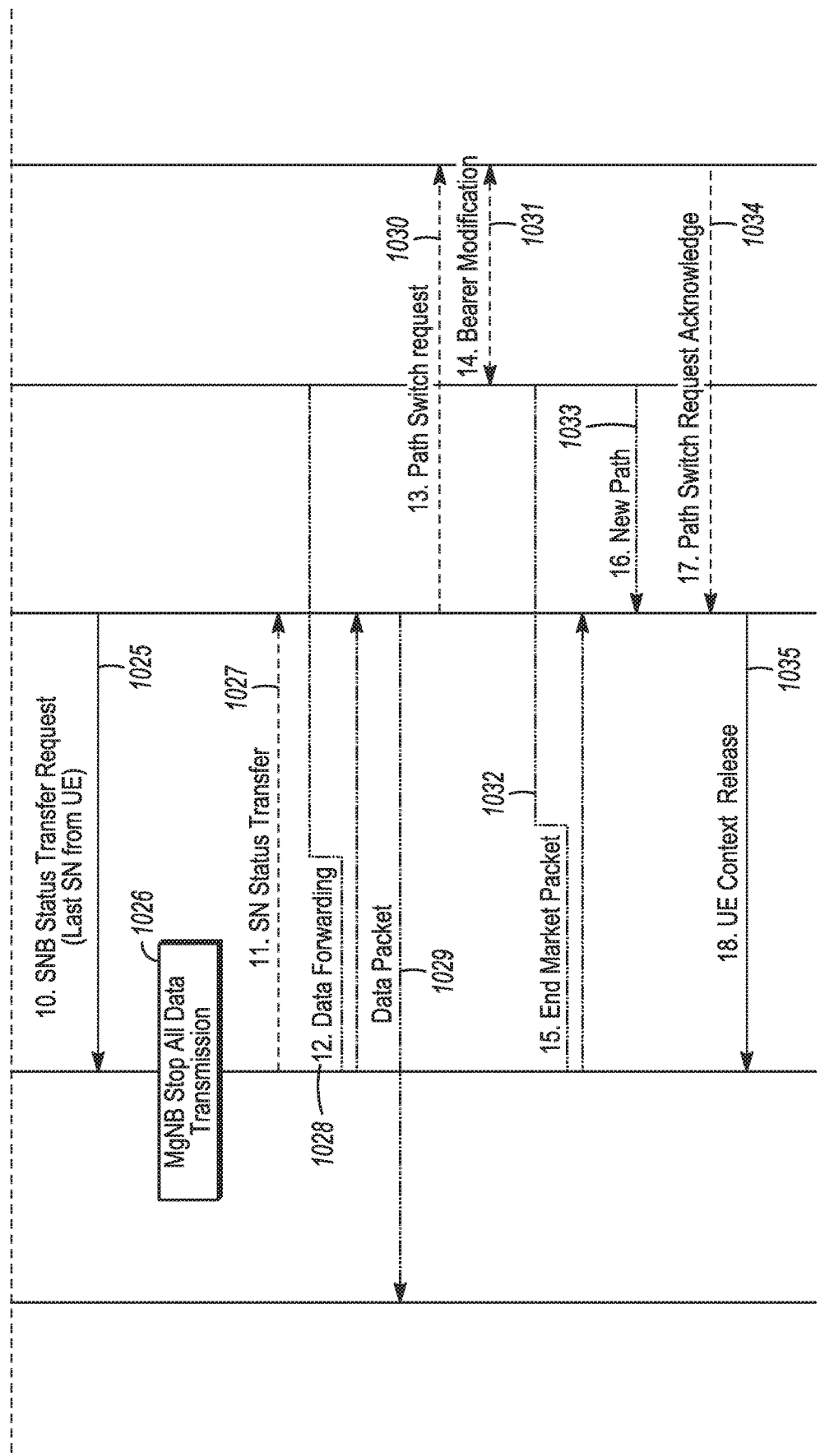
Figure 11:
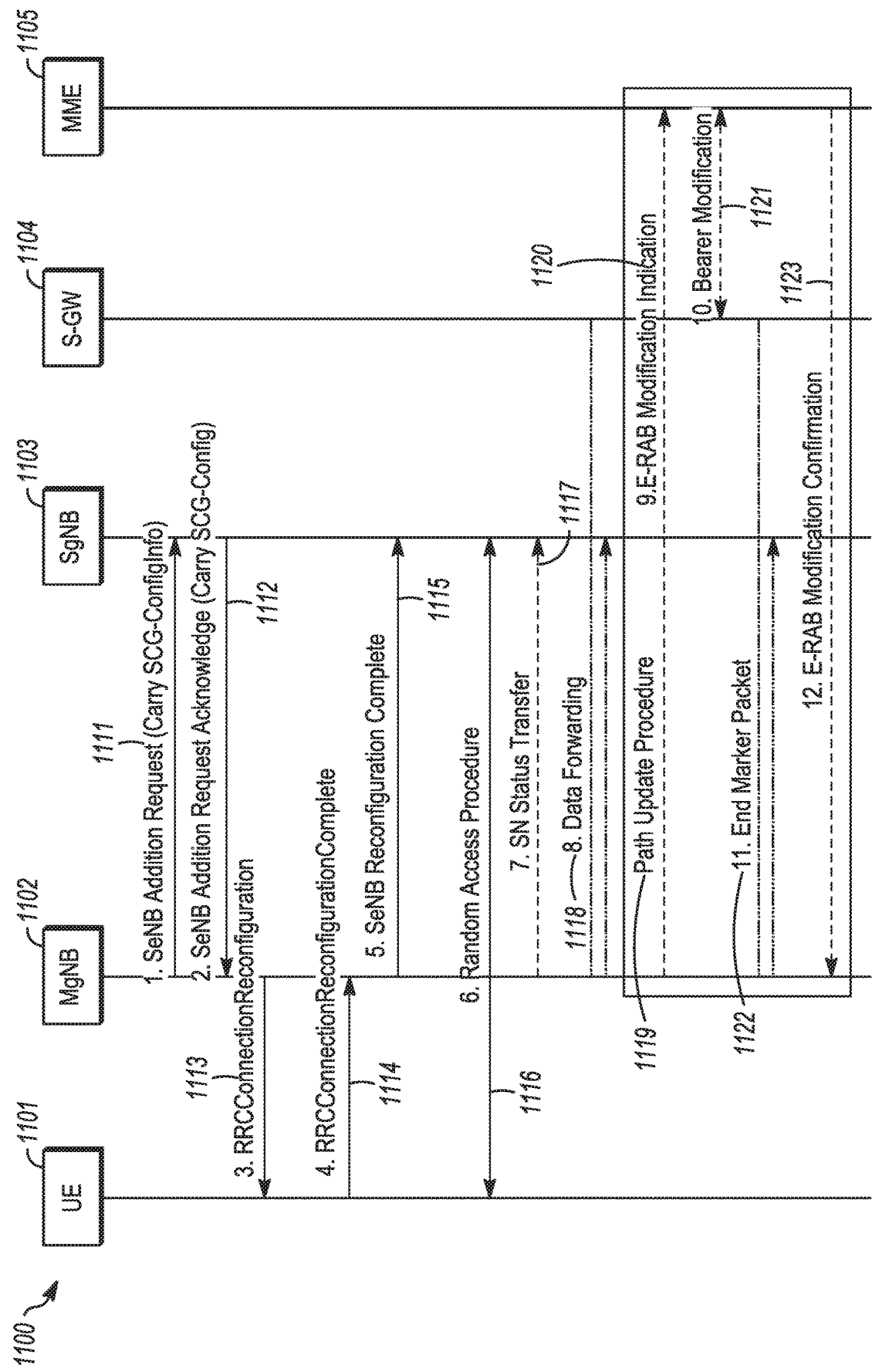
FIG. 11 illustrates additional example operations in accordance with some embodiments.
Figure 12:
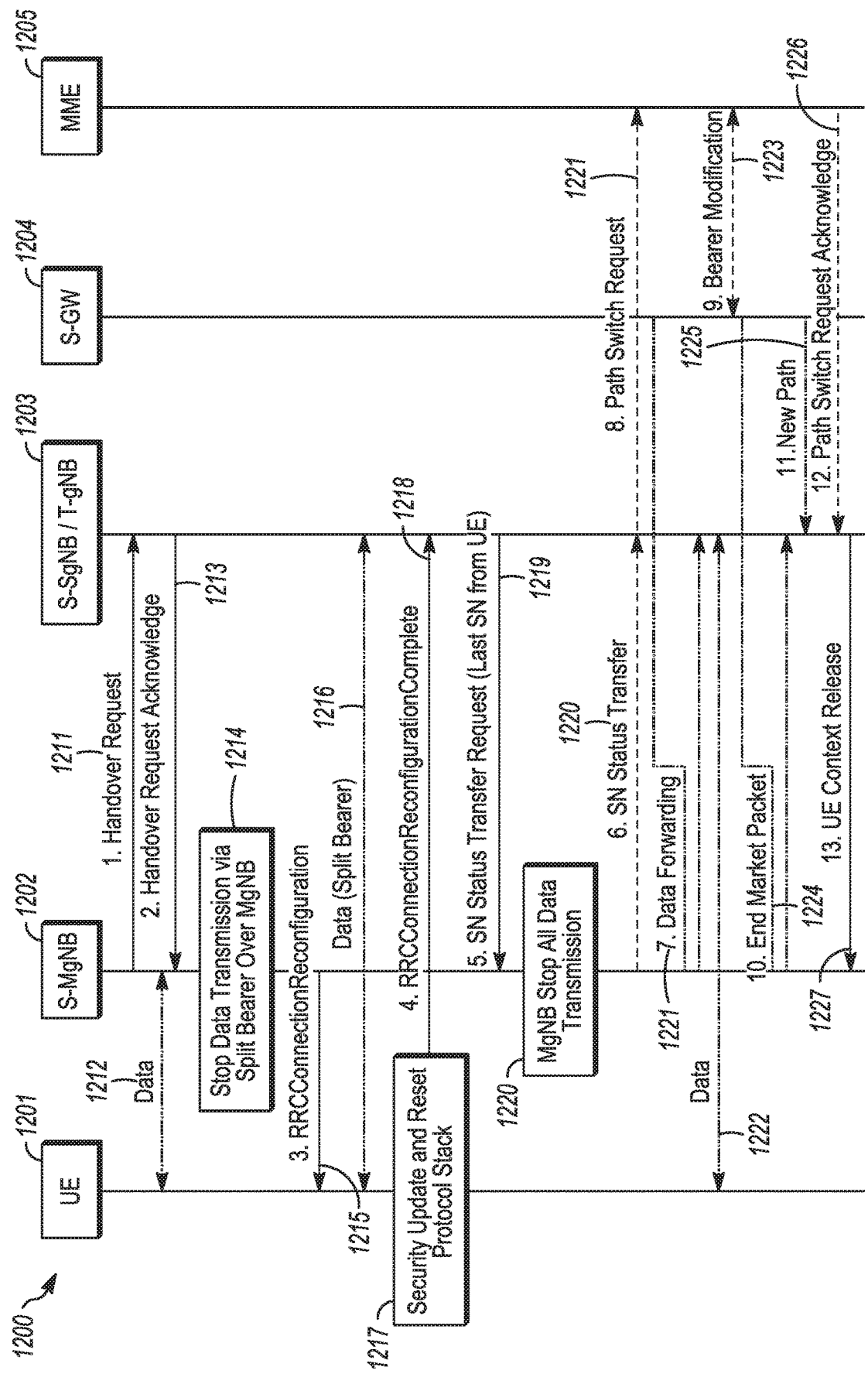
FIG. 12 illustrates additional example operations in accordance with some embodiments.

FIG. 9 illustrates examples of dual connectivity (DC) in accordance with some embodiments. FIG. 10 illustrates example operations in accordance with some embodiments. FIG. 11 illustrates additional example operations in accordance with some embodiments. FIG. 12 illustrates additional example operations in accordance with some embodiments. It should be noted that the examples shown in FIGS. 9-12 may illustrate some or all of the concepts and techniques described herein in some cases, but embodiments are not limited by the examples. For instance, embodiments are not limited by the name, number, type, size, ordering, arrangement and/or other aspects of the operations, messages, gNBs 105, UEs 102, cells and other elements as shown in FIGS. 9-12. Although some of the elements shown in the examples of FIGS. 9-12 may be included in a 3GPP LTE standard, 5G standard, NR standard and/or other standard, embodiments are not limited to usage of such elements that are included in standards.

In some embodiments, in accordance with intra-cell and/or inter-cell mobility, the UE 102 may support multiple beams (for example, dual beams is an example of multiple beams). Such cases may occur if the UE 102 has the capability to support dual/multiple transmit and receive beams simultaneously. In this case, the UE 102 may connect to dual/multiple transmit-receive points (TRPs) associated with a same NR cell or different NR cells.

Referring to the example scenario 900 in FIG. 9, multiple non-limiting examples of dual beam operation are illustrated. Embodiments are not limited to the number, type and/or arrangement of the UEs, gNBs, TRPs, cells, beams, links and/or other elements shown in FIG. 9.

In some scenarios, intra-cell dual beams may be used. The UE 920 (labelled as UE1) may use two beams 924, 926 and may connect to the TRP 922. The UE 930 (labelled as UE2) may use two beams 936, 938 and may connect to different TRPs 932, 934 within the same NR-cell 911. In some cases, usage of two beams may enable data boosting.

In some scenarios, inter-cell dual beams may be used. The UE 940 (labelled as UE3) may use two beams 946, 948 to connect to two different NR cells 913, 914. The UE 950 (labelled as UE4) may use two beams 956, 958 to connect to two different NR cells 911, 912. Usage of inter-cell beams may be used, in some cases, for handover purposes and may improve the service interruption time during handover.

Different scenarios may be supported in NR-NR DC. The scenarios can include the following combinations: NR low frequency and NR high frequency (which may be referred to below as "scenario 1"); NR high frequency and NR high frequency (which may be referred to below as "scenario 2"); NR low frequency and NR low frequency; and/or other scenarios. In a non-limiting example, a low frequency may be configured for macro cell usage and a high frequency may be configured for small cell usage. In such scenarios, low frequency macro can provide reliability for high frequency cells. In another non-limiting example, one or more of the above scenarios may be used for handover purposes for high frequency standalone deployment.

In a non-limiting example, for scenario 1 above, the low frequency macro cell may be supported by an MeNB and a high frequency TRP may be supported by an SeNB. In some embodiments, mobility between different cells/TRP in high frequency may use one or more of the following operations: SeNB addition; SeNB modification; SeNB release; change of SeNB; MeNB to eNB change; SCG change; eNB to MeNB change; inter-MeNB handover without SeNB change; and/or other.

In some embodiments, one or more of the following dual connectivity (DC) operations may be used in DC low-high frequency scenarios: SgNB addition; SgNB modification; SgNB release; change of SgNB; MgNB to gNB change; SCG change; gNB to MgNB change; inter-MgNB handover without SgNB change; and/or other operations.

In some embodiments, a RAN2 may support intra-frequency DC in NR at least for handover purposes. For intra-frequency DC in general, the solution may use and/or require simultaneous Tx/Rx or a TDM solution. The RAN2 may send an LS to RAN4 to confirm the feasibility of simultaneous Tx/Rx when the UE has dual RF chain for intra-frequency case. If TDM is needed, the RAN4 may should confirm if there is any issue with synchronization.

In some embodiments, the RAN2 may send an LS to RAN4 to confirm if intra-frequency DC (simultaneous Tx/Rx) is feasible when the UE has dual RF chains and if there is any issue with synchronization if a TDM solution is used.

In some cases, including but not limited to those in scenario 2 above, NR-NR DC may be applicable to two or more high frequency cells. In some embodiments, a handover procedure may be combined with an "SgNB becomes MgNB" procedure. In some embodiments, a target gNB may be added as an SgNB, and an "SgNB becomes MgNB" procedure may be implemented. In some cases, the "SgNB becomes MgNB" procedure may be performed after the addition of the target gNB, although the scope of embodiments is not limited in this respect.

In some embodiments, a handover procedure may be combined with an "SgNB becomes MgNB" procedure. A non-limiting example of such a combination is described below. References may be made to FIG. 10 in the description of the example below, but such references are not limiting. It should be noted that some embodiments may include more or fewer operations than shown in FIG. 10. Embodiments are not limited to the chronological order of operations shown in FIG. 10. Embodiments are not limited to the messages in terms of name, content and/or other aspects shown in FIG. 10. In some embodiments, one or more similar messages, different messages, alternate messages and/or other message(s) may be used.

As indicated by 1011, the source MgNB 1002 may issue a message (including but not limited to an SgNBAddition-Request with SgNB becomes MgNB message) to the target gNB 1003. The source MgNB 1002 may include an SCG configuration with an indication that an "SgNB becomes MgNB" procedure will be applied after the addition is successful. As indicated by 1012, the target gNB 1003 may send a SgNBAdditionRequestAcknowledge message with an indication that an SgNB addition with an "SgNB becomes MgNB" procedure is supported. It may also include a transparent container to be sent to the UE 1001 as an RRC message to perform the handover (as indicated by 1013). The container may include one or more of: a new C-RNTI; security algorithm identifiers for the target gNB 1003 for selected security algorithm(s); a dedicated RACH preamble; access parameter(s); SIB(s) and/or other parameter(s). The SgNBAdditionRequestAcknowledge message (as indicated by 1012) may also include RNL/TNL, information for the forwarding tunnels, in some embodiments.

If the source MgNB 1002 endorses the new configuration, the source MgNB 1002 may send the RRCConnectionReconfiguration message (as indicated by 1013) to the UE 1001. The message may include information related to a radio resource configuration of SCG according to the SCG-Config. The information may include a configuration of split bearer. The source MgNB 1002 may forward packets of an MCG bearer to the split bearer (as indicated by 1014). The RRCConnectionReconfiguration message (as indicated by 1013) may also include the transparent container generated by the target gNB 1003. The UE 1001 may receive the RRCConnectionReconfiguration message (as indicated by 1013). The message may include one or more of the elements described in the container above and/or other elements. For instance, one or more of a new C-RNTI, target gNB security algorithm identifiers, optionally dedicated RACH preamble, target eNB SIBS and/or other elements may be included.

The UE 1001 may apply the new configuration of SgNB part and may reply with an RRCConnectionReconfigurationComplete message (as indicated by 1015). In case the UE 1001 is unable to comply with (part of) the configuration included in the RRCConnectionReconfiguration message (as indicated by 1013), the UE 1001 may perform a reconfiguration failure procedure. When the source MgNB receives the message (as indicated by 1015), the UE 1001 may refrain from transmission of data from MCG bearer to the UE 1001. The data may be sent to the UE 1001 via split bear over MgNB (as indicated by 1017). The source MgNB may inform the SgNB (such as the target gNB 1003) that the UE 1001 has completed the reconfiguration procedure successfully (as indicated by 1016).

The UE 1001 may perform synchronization towards a PSCell of the SgNB (such as the target gNB 1003). Various options are possible for an order in which the UE 1001 sends the RRCConnectionReconfigurationComplete message and performs a Random Access procedure (as indicated by 1018) towards the SgNB. A successful RA procedure towards the SgNB is not necessarily required for a successful completion of the RRC Connection Reconfiguration procedure, in some embodiments.

The target gNB 1003 may send a message to indicate that the SgNB addition is successful (as indicated by 1019) to the source MgNB 1002. The source MgNB 1002 may refrain from transmission, on the split bearer, of data to the UE 1001 over MgNB. For instance, subsequent data may be sent to the UE 1001 via split bearer over target gNB 1003 (as indicated by 1020 and/or 1021).

In some embodiments, the source gNB 1002 may optionally send a RRCConnectionReconfiguration message (as indicated by 1022) to the UE 1001 to complete the "SgNB becomes MgNB" procedure. If this message is not sent, a "Make Before Break" procedure (including but not limited to a procedure of a 3GPP standard) may be used, in some embodiments.

In some embodiments, the Source gNB 1002 may send a RRCConnectionReconfiguration (HO command) message to the UE 1001. The RRCConnectionReconfiguration message may include a transparent container (HO command) generated by the target gNB (which may be an SgNB or may be configured as an SgNB, in some cases). The UE 1001 may receive the RRCConnectionReconfiguration message with one or more of the following: a new C-RNTI, one or more target gNB security algorithm identifiers, an optionally dedicated RACH preamble, target gNB SIBs and/or other parameter(s).

The UE 1001 may send an RRCConnectionReconfigurationComplete message (as indicated 1024) after security is updated and/or after a protocol stack is reset (for instance, the UE 1001 may release an SCG configuration), as indicated by 1023. The UE 1001 may also send the last successful SN to the target gNB 1003. As indicated by 1025, the target gNB 1003 may send a SN status transfer request to S-MgNB 1002 with the last SN from the UE 1001. This may be performed, in some cases, so that the S-MgNB 1002 may correctly forward data to the target gNB 1003.

If applicable, as indicated by 1027-1029, SN status transfer and data forwarding from the S-MgNB 1002 may take place any time after the operation indicated by 1013. The target gNB 1003 may buffer data and forward the data to the UE 1001 once the HO is completed. As indicated by 1030-1034, the target gNB 1003 may initiate an S1 Path Switch procedure. As indicated by 1035, the target gNB 1003 may initiate a UE Context Release procedure towards the source MgNB 1002.

As mentioned above, one or more of the above operations may be performed as part of a combination of a handover procedure and an "SgNB becomes MgNB" procedure, although the scope of embodiments is not limited in this respect.

In some embodiments, a handover procedure and an "SgNB becomes MgNB" procedure may be performed. Non-limiting examples of such procedures are described below. References may be made to FIGS. 11 and 12 in the description of the example below, but such references are not limiting. It should be noted that some embodiments may include more or fewer operations than shown in FIGS. 11 and 12. Embodiments are not limited to the chronological order of operations shown in FIGS. 11 and 12. Embodiments are not limited to the messages in terms of name, content and/or other aspects shown in FIGS. 11 and 12. In some embodiments, one or more similar messages, different messages, alternate messages and/or other message(s) may be used.

An example of an SgNB addition procedure is shown in FIG. 11. In some cases, the source MgNB may follow a same or similar procedure to add a target gNB as an SgNB. However, this SgNB addition procedure may be skipped, in some cases, if the target gNB is already operating as an SgNB of the source gNB when handover is triggered. One or more of the operations shown in FIG. 11 (including but not limited to 1111-1118) may be the same as or similar to operations shown in FIG. 10, although the scope of embodiments is not limited in this respect. In some embodiments, one or more of operations 1120-1123 may be performed. Those operations may be included in a path update procedure 1119, although the scope of embodiments is not limited in this respect.

The source MgNB 1202 may trigger a "SgNB becomes MgNB" procedure, including but not limited to the procedure shown in FIG. 12. The procedure may be triggered after an SgNB addition procedure, although the scope of embodiments is not limited in this respect. It should be noted that the HO execution signaling (1217-1227 in FIG. 12) may be the same as or similar to 1024-1035 of FIG. 10, in some embodiments.

As indicated by 1211, the source MgNB 1202 may send, as part of an "SgNB becomes MgNB" procedure, a HandoverRequest message to the target gNB 1203. The message may include an SgNBbecomesMgNB indicator, in some embodiments. The source MgNB 1202 may include an SCG configuration in HandoverPreparationInformation. In some cases, it may be assumed that the target gNB 1203 is already added as an SgNB before the operation indicated by 1211. It may also be assumed, in some cases, that the network has reconfigured the UE 1201 with split bearers before the HO request message sent at 1211. The data may be transferred to split bearer(s) to the UE Z01 before the HO request. Alternatively, the MgNB 1202 may reconfigure transfer of data via split bearer in 1215, in some embodiments. In this case, an additional RRCConnectionReconfigurationComplete message may be sent from the UE 1201 to confirm that the reconfiguration is completed.

As indicated by 1213, the target gNB 1203 may send the HandoverRequestAcknowledge message with an indication that the "SgNB becomes MgNB" procedure is supported. The message may also include a transparent container to be sent to the UE 1201 as an RRC message to perform the handover. The container may include one or more of: a new C-RNTI; target gNB security algorithm identifiers for selected security algorithms; a dedicated RACH preamble; one or more access parameters; one or more SIBs; and/or other parameter(s). The HandoverRequestAcknowledge message may also include RNL/TNL information for the forwarding tunnels, in some cases.

As indicated by 1215, the source MgNB 1202 may send the RRCConnectionReconfiguration message including the RRC container generated by the target gNB 1203 to the UE 1201 to trigger handover to target gNB 1203. As indicated by 1214, the source MgNB 1202 may refrain from sending data to the UE 1201 over MgNB starting from this point. The data may be sent to the UE 1201 via split bearer over SgNB. In the uplink direction, the UE 1201 may send data via split bearer over SgNB.

As indicated by 1218, the UE 1201 may send an RRCConnectionReconfigurationComplete message. As indicated by 1217, the message may be sent, in some embodiments, after security is updated and protocol stack is reset. For instance, the UE 1201 may release the SCG configuration. The UE 1201 may also send the last successful SN to the target gNB 1203.

As indicated by 1219, the target gNB 1203 may send an SN status transfer request to the S-MgNB 1202 with the last SN from the UE 1201 so that the S-MgNB 1202 may correctly forward data to the target gNB 1203. In some cases, if applicable, SN status transfer (as indicated by 1220) and data forwarding (as indicated by 1221) from the S-MgNB 1202 may be performed after the message of 1215 is exchanged. The target gNB 1203 may buffer the data and forward to the UE 1201 (as indicated by 1222). This may be performed once the HO is completed, in some cases, although the scope of embodiments is not limited in this respect.

As indicated by 1221 and 1223-1226, the target gNB 1203 may initiate an S1 Path Switch procedure. As indicated by 1227, the target gNB 1203 may initiate a UE Context Release procedure towards the source MgNB 1202.

In some embodiments, the UE 102 may send a buffer status report (BSR) (and/or other message) to request a UL grant for signaling radio bearer (SRB) traffic (for instance, an RRC Connection Reconfiguration Complete message) to the target gNB 105 during a handover. In some cases, such as in LTE, usage of an SRB in a secondary eNB may not be supported and the UE 102 may not necessarily send a BSR request to the SeNB for SRB. In some cases, a network may ignore the request for the UL grant to the SeNB if it is not permitted.

In some embodiments, once the SgNB 105 has sent a UL grant to the UE 102, the UE 102 may use the UL grant to send the RRC Reconfiguration Complete message with an indication of SRB ID (e.g. 1), or may use a default logical channel ID (e.g. 1) for SRB1. When the network receives the RRC Reconfiguration Complete message, components (such as the source gNB 105, the target gNB 105 and/or other) may determine that the message is intended for usage by the target gNB 105 (as opposed to the source gNB 105). A new security key may be used, in some cases.

In some embodiments, in cases in which the SgNB 105 may agree to have its own RRC entity or to support a split SRB, the SgNB 105 may not necessarily use the default value of SRB ID (e.g. 0, 1, or 2) or logical channel ID for SRB (e.g. 0, 1, or 2). Those default values may be reserved for SRB of MCG at the gNB 105, in some cases.

In some embodiments, a UL grant may be sent to the UE 102 via RRC grant in a handover command. In some cases, no TA or power control may be required since the UE 102 may be already connected with the SgNB 105.

In some embodiments, the UE 102 may monitor a PDCCH of a target gNB 105 to obtain a UL grant. In some cases, no TA or power control may be required since the UE 102 may be already connected with the SgNB 105.

In some embodiments, one or more bits in the BSR may indicate that the BSR is intended for the target gNB 105 during the handover.

In some embodiments, direct RRC message may be sent by the target gNB 105 and/or SgNB 105. In cases in which direct RRC is supported, the SgNB 105 may directly send, to the UE 102, a handover message with an indication that the SgNB 105 is to become an MgNB 105. In some embodiments, the handover message may include UL grant information.

In some embodiments, the target gNB 105 may create a new C-RNTI for the UE 102 to use after handover is completed. The new C-RNTI may be sent to the UE 102 via RRC in a HO command message or in a direct RRC message from the target gNB 105 if direct RRC is supported.

In some embodiments, the UL grant may be sent to the UE 102 by the source gNB 105. In some embodiments, the UL grant may include the new C-RNTI.

In some embodiments, an RRC message (including but not limited to an RRC Reconfiguration Complete message) may include a new C-RNTI to indicate, to the target gNB 105, that a handover is complete and/or that the new protocol and security is to be used.

In Example 1, a generation Node-B (gNB) may be configurable to operate as a target gNB. An apparatus of the gNB may comprise memory. The apparatus may further comprise processing circuitry. The processing circuitry may be configured to decode, from a source gNB, a message for a handover of a User Equipment (UE) to the target gNB, wherein: the source gNB is to operate as a master gNB (MgNB) before the handover, the message indicates a request for the target gNB to operate as a secondary gNB (SgNB) before the handover, and the message further indicates a request for the target gNB to operate as the MgNB after the handover. The processing circuitry may be further configured to, as part of operation as the SgNB: encode, for transmission to the UE, a first data packet received from the source gNB for relay to the UE. The processing circuitry may be further configured to, as part of operation as the MgNB: encode, for transmission to the UE, a second data packet received from a serving gateway (SGW) for relay to the UE. The memory may be configured to store at least a portion of the message.

In Example 2, the subject matter of Example 1, wherein the processing circuitry may be further configured to, before the handover occurs, decode one or more data packets from the source gNB for relay to the UE. The processing circuitry may be further configured to, after the handover occurs: decode one or more data packets from the SGW for relay to the UE; and refrain from reception of data packets from the source gNB for relay to the UE.

In Example 3, the subject matter of one or any combination of Examples 1-2, wherein the processing circuitry may be further configured to encode, for transmission to a mobility management entity (MME), a path switch request message that indicates a request for the SGW to transmit subsequent data packets to the target gNB as part of the handover.

In Example 4, the subject matter of one or any combination of Examples 1-3, wherein the processing circuitry may be further configured to decode, from the UE, a radio resource control (RRC) message that indicates that an RRC reconfiguration at the UE has been completed. The processing circuitry may be further configured to encode the path switch request message for transmission to the MME at least partly in response to reception of the RRC message from the UE.

In Example 5, the subject matter of one or any combination of Examples 1-4, wherein the message may be an SgNB addition request message. The processing circuitry may be further configured to encode, for transmission to the source gNB, an SgNB addition request acknowledge message that includes one or more of: a cell radio network temporary identifier (C-RNTI) to identify the UE in a random access channel (RACH) procedure between the UE and the target gNB, and a security algorithm identifier of the target gNB.

In Example 6, the subject matter of one or any combination of Examples 1-5, wherein the processing circuitry may be further configured to attempt to detect a RACH preamble from the UE. The processing circuitry may be further configured to encode, for transmission to the UE, a RACH message that indicates reception of the RACH preamble. The processing circuitry may be further configured to encode, for transmission to the source gNB, SgNB reconfiguration complete message that indicates a successful addition as the SgNB, the successful addition based at least partly on the reception of the RACH preamble.

In Example 7, the subject matter of one or any combination of Examples 1-6, wherein the processing circuitry may be further configured to encode, for transmission to the source gNB, a sequence number (SN) status transfer request message that indicates a highest SN of data packets received from the source gNB for relay to the UE. The processing circuitry may be further configured to decode, from the source gNB, an SN status transfer message that indicates a starting SN for subsequent data packets.

In Example 8, the subject matter of one or any combination of Examples 1-7, wherein the processing circuitry may be further configured to decode, from the UE, a buffer status report (BSR) to request an uplink grant for communication to the target gNB on a signaling radio bearer (SRB). The processing circuitry may be further configured to encode, for transmission to the UE, the uplink grant. The processing circuitry may be further configured to decode, from the UE, a radio resource control (RRC) reconfiguration complete message that indicates that an RRC reconfiguration at the UE has been completed.

In Example 9, the subject matter of one or any combination of Examples 1-8, wherein the processing circuitry may be further configured to decode, from the UE, a request for an uplink grant for communication to the target gNB on a signaling radio bearer (SRB). The processing circuitry may be further configured to encode, for transmission to the UE, a handover command that includes the uplink grant.

In Example 10, the subject matter of one or any combination of Examples 1-9, wherein the processing circuitry may be further configured to decode, from the UE, a request for an uplink grant for communication to the target gNB on a signaling radio bearer (SRB). The processing circuitry may be further configured to encode, for transmission to the UE, a physical downlink control channel (PDCCH) that includes the uplink grant.

In Example 11, the subject matter of one or any combination of Examples 1-10, wherein the processing circuitry may be further configured to decode, from the UE, a buffer status report (BSR) to request an uplink grant for communication to the target gNB on a signaling radio bearer (SRB). A bit field of one or more bits may indicate that the BSR is intended for the target gNB. The processing circuitry may be further configured to encode, for transmission to the UE, the uplink grant.

In Example 12, the subject matter of one or any combination of Examples 1-11, wherein the processing circuitry may be further configured to decode, from the UE, a request for an uplink grant for communication to the target gNB on a signaling radio bearer (SRB). The processing circuitry may be further configured to encode, for transmission to the UE, a radio resource control (RRC) message that indicates: the uplink grant, and an indication that the target gNB has begun operation as the MgNB.

In Example 13, the subject matter of one or any combination of Examples 1-12, wherein the processing circuitry may be further configured to determine a cell radio network temporary identifier (C-RNTI) to identify the UE after the handover is completed. The processing circuitry may be further configured to encode, for transmission to the UE: a radio resource control (RRC) message that includes the C-RNTI, or a handover command that includes the C-RNTI.

In Example 14, the subject matter of one or any combination of Examples 1-13, wherein the target gNB may be arranged to operate in accordance with a New Radio (NR) protocol.

In Example 15, the subject matter of one or any combination of Examples 1-14, wherein the apparatus may further include a transceiver to receive the message and to transmit the first and second data packets.

In Example 16, the subject matter of one or any combination of Examples 1-15, wherein the processing circuitry may include a baseband processor to decode the message and to encode the first and second data packets.

In Example 17, a computer-readable storage medium may store instructions for execution by one or more processors to perform operations for communication by a generation Node-B (gNB). The gNB may be configurable to operate as a source gNB. The operations may configure the one or more processors to determine that a handover of a User Equipment (UE) to a target gNB is to be performed. The operations may further configure the one or more processors to encode, for transmission to the target gNB, an SgNB addition request message for an establishment of a split bearer for the handover, wherein the source gNB is to operate as a master gNB (MgNB) of the split bearer. The SgNB addition request message may indicate: a request for an addition of the target gNB to the split bearer as a secondary gNB (SgNB), and that the target gNB is to operate as the MgNB of the split bearer after the handover. The operations may further configure the one or more processors to decode, from the target gNB, an SgNB addition request acknowledge message that indicates a successful addition of the target gNB as the SgNB of the split bearer. The operations may further configure the one or more processors to, based on the successful addition of the target gNB as the SgNB, refrain from transmission of data packets to the UE on the split bearer.

In Example 18, the subject matter of Example 17, wherein the operations may further configure the one or more processors to determine that the handover is to be performed based at least partly on one or more of: a first signal quality measurement for a first link between the UE and the source gNB, and a second signal quality measurement for a second link between the UE and the target gNB.

In Example 19, an apparatus of a User Equipment (UE) may comprise memory. The apparatus may further comprise processing circuitry. The processing circuitry may be configured to decode, from a source generation Node-B (gNB), a first data packet. The processing circuitry may be further configured to decode, from the source gNB, a first message that indicates: an establishment of a split bearer for a handover of the UE to a target gNB, and a security parameter to be used by the UE for communication with the target gNB on the split bearer. The processing circuitry may be further configured to exchange one or more random access channel (RACH) messages with the target gNB for a synchronization with the target gNB for the split bearer. The processing circuitry may be further configured to, if the synchronization is successful: encode, for transmission to the source gNB, a second message that indicates that the source gNB is to refrain from transmission of data packets to the UE on the split bearer; and decode, from the target gNB on the split bearer, a second data packet in accordance with the security parameter included in the first message. The memory may be configured to store the first data packet.

In Example 20, the subject matter of Example 19, wherein the processing circuitry may be further configured to encode, for transmission to the target gNB, a buffer status report (BSR) to request an uplink grant for communication to the target gNB on a signaling radio bearer (SRB). The processing circuitry may be further configured to decode, from the target gNB, the uplink grant. The processing circuitry may be further configured to encode, for transmission to the target gNB, a radio resource control (RRC) reconfiguration complete message that indicates that an RRC reconfiguration for the split bearer at the UE has been completed.

In Example 21, the subject matter of one or any combination of Examples 19-20, wherein the processing circuitry may be further configured to encode the RRC reconfiguration complete message to include at least one of: a predetermined SRB identifier (ID), and a predetermined logical channel ID.

In Example 22, the subject matter of one or any combination of Examples 19-21, wherein the processing circuitry may be further configured to encode, for transmission to the target gNB, a buffer status report (BSR) to request an uplink grant for communication to the target gNB on a signaling radio bearer (SRB). The processing circuitry may be further configured to decode, from the source gNB, the uplink grant. The processing circuitry may be further configured to encode, for transmission to the target gNB, a radio resource control (RRC) reconfiguration complete message that indicates that an RRC reconfiguration for the split bearer at the UE has been completed.

In Example 23, a generation Node-B (gNB) may be configurable to operate as a master gNB (MgNB) of a split bearer. An apparatus of the gNB may comprise memory. The apparatus may further comprise processing circuitry. The processing circuitry may be configured to encode a first data packet for transmission to a User Equipment (UE) on the split bearer. The processing circuitry may be further configured to encode a second data packet for transmission to a secondary gNB (SgNB) of the split bearer for relay to the UE on the split bearer. The processing circuitry may be further configured to determine that a handover of the UE to the SgNB is to be performed. The processing circuitry may be further configured to encode, for transmission to the SgNB, a handover request message that indicates that the handover is to be performed and further indicates that the SgNB is to operate as the MgNB of the split bearer after the handover. The processing circuitry may be further configured to refrain from transmission of data packets to the UE on the split radio bearer. The memory may be configured to store the first and second data packets.

In Example 24, the subject matter of Example 23, wherein the processing circuitry may be further configured to determine that the handover is to be performed based at least partly on one or more of: a first signal quality measurement for a first link between the UE and the MgNB, and a second signal quality measurement for a second link between the UE and the SgNB.

In Example 25, a generation Node-B (gNB) may be configurable to operate as a source gNB. An apparatus of the gNB may comprise means for determining that a handover of a User Equipment (UE) to a target gNB is to be performed. The apparatus may further comprise means for encoding, for transmission to the target gNB, an SgNB addition request message for an establishment of a split bearer for the handover, wherein the source gNB is to operate as a master gNB (MgNB) of the split bearer. The SgNB addition request message may indicates a request for an addition of the target gNB to the split bearer as a secondary gNB (SgNB), and that the target gNB is to operate as the MgNB of the split bearer after the handover. The apparatus may further comprise means for decoding, from the target gNB, an SgNB addition request acknowledge message that indicates a successful addition of the target gNB as the SgNB of the split bearer. The apparatus may further comprise means for, based on the successful addition of the target gNB as the SgNB, refraining from transmission of data packets to the UE on the split bearer.

In Example 26, the subject matter of Example 25, wherein the apparatus may further comprise means for determining that the handover is to be performed based at least partly on one or more of: a first signal quality measurement for a first link between the UE and the source gNB, and a second signal quality measurement for a second link between the UE and the target gNB.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus, comprising:
    memory; and
    processing circuitry in communication with the memory, wherein the processing circuitry is configured to:
        decode a message for a handover of a User Equipment (UE) to a target base station, wherein a source base station is a primary base station for the UE before the handover;
        determine, based on the message, that the target base station is to be the primary base station for the UE after the handover;
        encode, for transmission to the source base station, a sequence number (SN) status transfer request message that indicates a highest SN of data packets received from the source base station for relay to the UE;
        decode, from the source base station, an SN status transfer message that indicates a starting SN for subsequent data packets;
        encode, for transmission to the UE while operating as a secondary base station, a first data packet received from the source base station;
        encode, for transmission to the UE while operating as the primary base station, a second data packet received from the network; and
        refrain from reception of data packets from the source base station for relay to the UE.

2. The apparatus according to claim 1, the processing circuitry further configured to:
    before the handover occurs, decode one or more data packets from the source base station for relay to the UE; and
    after the handover occurs:
        decode one or more data packets from a serving gateway (SGW) for relay to the UE.

3. The apparatus according to claim 1, the processing circuitry further configured to:
    encode, for transmission to a mobility management entity (MME), a path switch request message that indicates a request for a serving gateway (SGW) to transmit subsequent data packets to the target base station as part of the handover.

4. The apparatus according to claim 1, the processing circuitry further configured to:
    decode, from the UE, a radio resource control (RRC) message that indicates that an RRC reconfiguration at the UE has been completed; and
    encode a path switch request message for transmission to a mobility management entity (MME) at least partly in response to reception of the RRC message from the UE.

5. The apparatus according to claim 1,
    wherein the message is a secondary base station addition request message, and wherein the processing circuitry is further configured to:
        encode, for transmission to the source base station, a secondary base station addition request acknowledge message that includes one or more of:
            a cell radio network temporary identifier (C-RNTI) to identify the UE in a random access channel (RACH) procedure between the UE and the target base station, and
            a security algorithm identifier of the target base station.

6. The apparatus according to claim 5, the processing circuitry further configured to:
    attempt to detect a RACH preamble from the UE;
    encode, for transmission to the UE, a RACH message that indicates reception of the RACH preamble; and
    encode, for transmission to the source base station, secondary base station reconfiguration complete message that indicates a successful addition as the secondary base station, the successful addition based at least partly on the reception of the RACH preamble.

7. The apparatus according to claim 1, the processing circuitry further configured to:
    decode, from the UE, a buffer status report (BSR) to request an uplink grant for communication to the target base station on a signaling radio bearer (SRB);
    encode, for transmission to the UE, the uplink grant; and
    decode, from the UE, a radio resource control (RRC) reconfiguration complete message that indicates that an RRC reconfiguration at the UE has been completed.

8. The apparatus according to claim 1, the processing circuitry further configured to:
    decode, from the UE, a request for an uplink grant for communication to the target base station on a signaling radio bearer (SRB); and
    encode, for transmission to the UE, a handover command that includes the uplink grant.

9. The apparatus according to claim 1, the processing circuitry further configured to:
    decode, from the UE, a request for an uplink grant for communication to the target base station on a signaling radio bearer (SRB); and
    encode, for transmission to the UE, a physical downlink control channel (PDCCH) that includes the uplink grant.

10. The apparatus according to claim 1, the processing circuitry further configured to:
    decode, from the UE, a buffer status report (BSR) to request an uplink grant for communication to the target base station on a signaling radio bearer (SRB),
    wherein a bit field of one or more bits indicates that the BSR is intended for the target base station; and
    encode, for transmission to the UE, the uplink grant.

11. The apparatus according to claim 1, the processing circuitry further configured to:
    decode, from the UE, a request for an uplink grant for communication to the target base station on a signaling radio bearer (SRB); and
    encode, for transmission to the UE, a radio resource control (RRC) message that indicates:
        the uplink grant, and an indication that the target base station has begun operation as the primary base station.

12. The apparatus according to claim 1, the processing circuitry further configured to:
determine a cell radio network temporary identifier (C-RNTI) to identify the UE after the handover is completed; and
encode, for transmission to the UE:
a radio resource control (RRC) message that includes the C-RNTI, or
a handover command that includes the C-RNTI.

13. The apparatus according to claim 1, wherein the target base station is arranged to operate in accordance with a Previously Presented Radio (NR) protocol.

14. The apparatus according to claim 1, wherein the apparatus further includes a transceiver to receive the message and to transmit the first and second data packets.

15. The apparatus according to claim 1, wherein the processing circuitry includes a baseband processor to decode the message and to encode the first and second data packets.

16. A method, comprising:
decoding a message for a handover of a User Equipment (UE) to a target base station, wherein a source base station is a primary base station for the UE before the handover;
determining, based on the message, that the target base station is to be the primary base station for the UE after the handover;
encoding, for transmission to the source base station, a sequence number (SN) status transfer request message that indicates a highest SN of data packets received from the source base station for relay to the UE;
decoding, from the source base station, an SN status transfer message that indicates a starting SN for subsequent data packets;
encoding, for transmission to the UE while operating as a secondary base station, a first data packet received from the source base station;
encoding, for transmission to the UE while operating as the primary base station, a second data packet received from the network; and
refraining from reception of data packets from the source base station for relay to the UE.

17. The method of claim 16, further comprising:
decoding, before the handover occurs, one or more data packets from the source base station for relay to the UE; and
decoding, after the handover occurs, one or more data packets from a serving gateway (SGW) for relay to the UE.

18. The method of claim 16, further comprising:
encoding, for transmission to a mobility management entity (MME), a path switch request message that indicates a request for a serving gateway (SGW) to transmit subsequent data packets to the target base station as part of the handover.

19. A non-transitory computer-readable storage medium that stores instructions for execution by one or more processors to cause a device to:
decode a message for a handover of a User Equipment (UE) to a target base station, wherein a source base station is a primary base station for the UE before the handover;
determine, based on the message, that the target base station is to be the primary base station for the UE after the handover;
encode, for transmission to the source base station, a sequence number (SN) status transfer request message that indicates a highest SN of data packets received from the source base station for relay to the UE;
decode, from the source base station, an SN status transfer message that indicates a starting SN for subsequent data packets;
encode, for transmission to the UE while operating as a secondary base station, a first data packet received from the source base station;
encode, for transmission to the UE while operating as the primary base station, a second data packet received from the network; and
refrain from reception of data packets from the source base station for relay to the UE.

20. The non-transitory computer-readable storage medium of claim 19,
wherein the instructions for execution by the one or more processors further cause the device to:
before the handover occurs, decode one or more data packets from the source base station for relay to the UE; and
after the handover occurs, decode one or more data packets from a serving gateway (SGW) for relay to the UE.

21. The non-transitory computer-readable storage medium of claim 19,
wherein the instructions for execution by the one or more processors further cause the device to:
encode, for transmission to a mobility management entity (MME), a path switch request message that indicates a request for a serving gateway (SGW) to transmit subsequent data packets to the target base station as part of the handover.

22. The non-transitory computer-readable storage medium of claim 19,
wherein the instructions for execution by the one or more processors further cause the device to:
decode, from the UE, a radio resource control (RRC) message that indicates that an RRC reconfiguration at the UE has been completed; and
encode a path switch request message for transmission to a mobility management entity (MEE) at least partly in response to reception of the RRC message from the UE.

* * * * *

UNITED STATES PATENT AND TRADEMARK OFFICE
CERTIFICATE OF CORRECTION

Page 1 of 1

PATENT NO. : 12,082,056 B2
APPLICATION NO. : 16/479176
DATED : September 3, 2024
INVENTOR(S) : Candy Yiu et al.

It is certified that error appears in the above-identified patent and that said Letters Patent is hereby corrected as shown below:

In the Claims

Column 32, Line 62, delete "frorn" and substitute --from--.

Signed and Sealed this
Twenty-ninth Day of April, 2025

Coke Morgan Stewart
*Acting Director of the United States Patent and Trademark Office*